(12) United States Patent
Miller

(10) Patent No.: US 6,338,043 B1
(45) Date of Patent: Jan. 8, 2002

(54) METHOD AND APPARATUS FOR DEVELOPING A PACKAGE OF MEDIA ADVERTISING SPOTS

(75) Inventor: Laurence Blair Miller, Marina Del Rey, CA (US)

(73) Assignee: Nielsen Media Research, Schaumburg, IL (US)

(*) Notice: Subject to any disclaimer, the term of this patent is extended or adjusted under 35 U.S.C. 154(b) by 0 days.

(21) Appl. No.: 09/203,160

(22) Filed: Dec. 1, 1998

(51) Int. Cl.[7] .............................................. G06F 17/60
(52) U.S. Cl. .......................................... 705/14; 705/10
(58) Field of Search ....................... 705/14, 10; 725/32, 725/38

(56) References Cited

U.S. PATENT DOCUMENTS

| | | | | |
|---|---|---|---|---|
| 4,982,346 A | * | 1/1991 | Girouard et al. | 705/14 |
| 5,227,874 A | * | 7/1993 | Kohorn | 705/10 |
| 5,331,544 A | * | 7/1994 | Lu et al. | 705/10 |
| 5,490,060 A | * | 2/1996 | Malec et al. | 705/10 |
| 5,740,549 A | * | 4/1998 | Reilly et al. | 705/14 |
| 5,765,141 A | * | 6/1998 | Spector | 705/14 |
| 5,848,397 A | * | 12/1998 | Marsh et al. | 705/14 |
| 5,893,075 A | * | 4/1999 | Plainfield et al. | 705/14 |
| 5,933,811 A | * | 8/1999 | Angles et al. | 705/14 |
| 5,937,392 A | * | 8/1999 | Alberts | 705/14 |
| 5,966,696 A | * | 10/1999 | Giraud | 705/14 |
| 5,970,469 A | * | 10/1999 | Scroggie et al. | 705/14 |
| 5,974,396 A | * | 10/1999 | Anderson et al. | 705/10 |
| 5,974,398 A | * | 10/1999 | Hanson et al. | 705/14 |
| 5,992,888 A | * | 11/1999 | North et al. | 283/56 |
| 5,999,912 A | * | 12/1999 | Wodarz et al. | 705/14 |
| 6,026,369 A | * | 2/2000 | Capek | 705/14 |

FOREIGN PATENT DOCUMENTS

| | | | | |
|---|---|---|---|---|
| WO | WO01/15021 | * | 3/2001 | G06F/17/30 |

OTHER PUBLICATIONS

Behind the faces; computer companies are turning to TV to send messages—Datamation v32 p37(4) Feb. 15, 1986 Irene Fuerst.*

Guide, *Integrated Solutions For A New Television Industry, Viewtime, Moneytime, Airtime*, Peaktime S.A., 38 pages.

* cited by examiner

*Primary Examiner*—Vincent Millin
*Assistant Examiner*—Geoffery Akers
(74) *Attorney, Agent, or Firm*—Marshall, O'Toole, Gerstein, Murray & Borun

(57) ABSTRACT

Methods and apparatus for automatically developing a package of advertising spots from a plurality of available spots offered by a plurality of media suppliers are disclosed. In one implementation, an apparatus includes a package developer cooperating with the memory to develop a package containing a subset of the representations of the available spots based on at least one of a plurality of guideline variables. The apparatus also includes a validator cooperating with the package developer to validate the package by ensuring that every media supplier associated with the representations in the subset supplies a minimum percentage of the spots in the subset.

43 Claims, 28 Drawing Sheets

FIG. 13

METHOD AND APPARATUS FOR DEVELOPING A PACKAGE OF MEDIA ADVERTISING SPOTS

FIELD OF THE INVENTION

The invention relates generally to media buying systems, and, more particularly, to an apparatus for automatically developing a package of advertising spots from a plurality of available advertising spots for television broadcast, radio broadcast, internet broadcast and/or other media.

BACKGROUND OF THE INVENTION

Media buyers such as advertising agencies are presented with an ever increasing number of options in representing clients. For example, over the years traditional advertising media such as television (both cable and free broadcast) and radio broadcasting have experienced a growth in the number of broadcasters, and, thus, the number of advertising opportunities they offer. A similar increase has occurred in print media such as newspapers and magazines. More recently, the rising popularity of the internet has created an entire new realm of advertising opportunities. Faced with such a proliferation of choices, purchasing advertising spots to develop an advertising campaign can often be a time-consuming, taxing process with considerable resources spent in sorting through, identifying and purchasing the optimum available advertising spots for a given campaign.

The process for purchasing advertising spots in the television media illustrates these issues. As is well known, there are a number of television stations selling advertising spots to be aired in association with entertainment programs and the like airing at various times of the day. As is also well known, the value of a given advertising spot is dependent upon a number of factors, including: the popularity of the program associated with the spot, the time of day the spot will air, and the length of the spot. The value, of course, primarily depends upon the number of viewers exposed to the spot and, secondarily, upon the demographics of the viewing audience.

In order to approach the process of purchasing advertising spots in a disciplined and efficient manner, media buyers have developed several conventions and tools. For example, the times of the day are broken down into blocks of hours referred to as "dayparts". Dayparts are defined in terms of times of the day and days of the week. For example, the "Early Morning" daypart is commonly defined as the time period occurring on weekdays, from 6:00 a.m. to 9:00 a.m.

As is well known, Nielsen Media Research offers a sophisticated television ratings system in which it monitors and develops reliable information about the size and demographics of the television viewing audience. The measure of the audience size is typically enunciated in terms of ratings. Media buyers capitalize on the existence of these ratings to determine the value of purchasing an advertising spot on a given program. For example, media buyers often measure the cost effectiveness of buying a particular spot based on its cost-per-point (CPP) value. The CPP value of a spot associated with a given program is calculated by dividing the purchase price of the spot by the rating of that program. Thus, if a given program has a Nielsen Media Research rating of "4", and the station charges $300 for a thirty second announcement in the program, then the CPP for that spot is $75 CPP (i.e., $300/4).

In developing media plans, media buyers often speak of "gross rating points' or GRPs. GRPs are simply a sum of program ratings for a group of individual programs. For example, a plan may call for 100 GRPs to be purchased in the "Early News" daypart over a given number of weeks. The media buyer's job is then to purchase spots on a group of programs that reach the target 100 GRPs for the selected time period while staying within the allocated budget. A media plan typically covers a number of weeks, specifies the number of GRPs to be spent per week and per daypart, and identifies a budget, usually broken down by daypart.

In any event, after the media plan has been created, the media buyer begins to identify and purchase spots that, when taken together, substantially meet the goals of the media plan. To this end, the media buyer contacts the relevant TV stations or their sales representatives to request lists of commercial announcement spots of the appropriate length that are available during the duration of the campaign. The spots on this list are commonly referred to as "availables" or "avails". Once the avails are obtained, the media buyers develops estimates of the rating performance of each of the available spot announcements.

Once the rating performance of the spots are estimated, the buyer groups the spots together by daypart. Grouping the spots by daypart facilitates comparison between the available spots from all stations within a daypart. Such comparison enables the buyer to determine which are the best spots to fulfill the requirements of that daypart as specified in the media plan. To make this determination, the media buyer typically considers the CPPs of the available spots. The CPPs are probably the most important measure of whether a particular spot will help the buyer achieve the daypart goals. If the station wants too much money for a program with a low rating, then the CPP for that program will be too high to fit within the media plan budget.

In order to fulfill the daypart goals most efficiently (i.e., at the lowest CPP), the media buyer begins to manually "package" the spots with the lowest CPPs. The verb "package" as used in this context refers to the process of selecting spots and grouping the selected spots together with other selected spots. The group of selected spots is commonly referred to as "the package". In any event, the buyer typically selects those spots with the lowest CPP for addition to the package.

In some instances, there is an opportunity to place more than one spot in a program per week. To guide the buyer faced with such opportunities, the media plan spells out media buying guidelines indicating the number of spots per week that can be placed in a "stripped program" (i.e., a program that runs five days per week). A typical number of permissible spots in a stripped program is three spots per week. The media buying guidelines include other parameters. For example, they typically set a minimum rating that each spot must equal or exceed.

After packaging the spots for the daypart in question, the media buyer puts together packages for the remaining dayparts on a daypart by daypart basis within the established budget. When all of the packages for the dayparts are completed, the buyer reviews all of the packages to determine how much advertising overall is assigned to each station. If this station by station review indicates an unsatisfactory distribution, the buyer may then re-select spots to achieve an acceptable advertising apportionment. The entire process typically takes 1.5 to 4 hours to complete.

SUMMARY OF THE INVENTION

In accordance with an aspect of the invention, an apparatus for use with a memory storing a plurality of representations of available advertising spots is provided for automatically developing a package of advertising spots from the plurality of available advertising spots. The apparatus includes a plurality of guideline variables stored in the memory. It also includes a daypart selector cooperating with the memory to develop a first set of available spots in a first daypart and a second set of available spots in a second daypart from the plurality of available advertising spots. The apparatus is further provided with a spot selector cooperating with the memory and the daypart selector to develop a package of available spots from the first and second sets of available spots based on the guideline variables. Additionally, the apparatus includes a tester cooperating with the spot selector for excluding spots from the package based on a first predefined criteria defined by at least one of the guideline variables.

In some embodiments, the representations of the available spots each respectively include a cost per point value, and the spot selector develops the package by searching the first set for an available spot based on the cost per point values. In some such embodiments, the spot selector develops the package by searching the second set for an available spot based on the cost per point values. In some such embodiments, the order in which the spot selector searches the first and second sets is user definable.

In some embodiments, the spot selector and the tester complete developing a first selected one of the first and second sets before developing a second selected one of the first and second sets. In such embodiments, the first selected one and the second selected one of the first and second sets may optionally be user definable.

In some embodiments, the spot selector continues passing spots meeting the first predefined criteria to the tester until a second predefined criteria defined by at least one of the guideline variables is satisfied. Optionally, the second predefined criteria may comprise a threshold sum of gross rating points to be purchased for the first daypart, or a threshold sum of gross rating points to be purchased for a campaign including at least the first and second dayparts.

In accordance with another aspect of the invention, an apparatus for use with a memory storing a plurality of representations of available advertising spots offered by a plurality of media suppliers is provided for automatically developing a package of advertising spots from a plurality of available advertising spots offered by a plurality of media suppliers. The apparatus includes a package developer cooperating with the memory to develop a package containing a subset of the representations stored in memory based on at least one of a plurality of guideline variables. Additionally, the apparatus is provided with a validator cooperating with the package developer to validate the package by ensuring that every media supplier associated with the representations in the subset supplies a minimum percentage of the spots in the subset.

Preferably, if the validator determines that a given supplier falls below the minimum percentage, the package developer develops a second package including a second subset of the representations stored in the memory based on the at least one of the plurality of guideline variables and by excluding all spots associated with the given supplier from the second subset.

In accordance with yet another aspect of the invention, an apparatus for use with a memory for storing a plurality of representations of available advertising spots is provided for automatically developing a package of advertising spots from the plurality of available advertising spots. The apparatus includes a plurality of guideline variables stored in the memory. The guideline variables include supplier percentage variables defining a percentage of gross rating points to be purchased from each media supplier in a set of media suppliers. The apparatus also includes a daypart selector cooperating with the memory to develop a first set of available spots in a first daypart from the plurality of available advertising spots. The apparatus is further provided with a spot selector cooperating with the memory and the daypart selector to develop a package of available spots from the first set of available spots based on the guideline variables. Additionally, the apparatus includes a tester cooperating with the spot selector for excluding spots from the package based on a first predefined criteria defined by at least one of the guideline variables and based upon the supplier percentage variables such that, upon completion of the package, the package contains spots from the media suppliers in the set of media suppliers apportioned in the percentages defined by the supplier percentage variables.

Optionally, the supplier percentage variables and/or the set of media suppliers may be user definable.

In accordance with still another aspect of the invention, a method is provided for automatically developing a package of advertising spots from a plurality of available advertising spots. The method comprises the steps of developing a first set of available spots in a first daypart from a plurality of available advertising spots; developing a second set of available spots in a second daypart from a plurality of available advertising spots, developing a package of available spots from the first and second sets of available spots based on guideline variables; and excluding spots from the package based on a first predefined criteria defined by at least one of the guideline variables.

In accordance with another aspect of the invention a method for automatically developing a package of advertising spots from a plurality of available advertising spots offered by a plurality of media suppliers is provided. The method comprises the steps of: storing a plurality of representations of available advertising spots offered by a plurality of media suppliers; developing a package containing a subset of the representations based on guideline variables; and validating the package by ensuring that every media supplier associated with the representations in the subset supplies a minimum percentage of the spots in the subset.

Preferably, the method further comprises the step of: if a given supplier falls below the minimum percentage, developing a second package including a second subset of the representations stored in the memory based on the guideline variables and by excluding all spots associated with the given supplier from the second subset.

In accordance with yet another aspect of the invention, a method for automatically developing a package of advertising spots from a plurality of available advertising spots is provided. The method comprises the steps of: providing a plurality of guideline variables including supplier percentage variables defining a percentage of gross rating points to be purchased from each media supplier in a set of media suppliers; developing a first set of available spots in a first daypart from the plurality of available advertising spots; developing a package of available spots from the first set of available spots based on the guideline variables; and excluding spots from the package based on a first predefined criteria defined by at least one of the guideline variables and based upon the supplier percentage variables such that, upon completion of the package, the package contains spots from the user defined media suppliers apportioned in the percentages defined by the supplier percentage variables.

Other features and advantages are inherent in the apparatus claimed and disclosed or will become apparent to those skilled in the art from the following detailed description and its accompanying drawings.

BRIEF DESCRIPTION OF THE DRAWING

FIGS. 3A–3M are flow charts illustrating a preferred computer program implementing the apparatus of FIGS. 1 and 2.

FIGS. 12 and 13 are views similar to FIGS. 7–8 but showing exemplary summary and station charts generated by the Einstein 2 routine.

DESCRIPTION OF THE PREFERRED EMBODIMENTS

Figure 1:
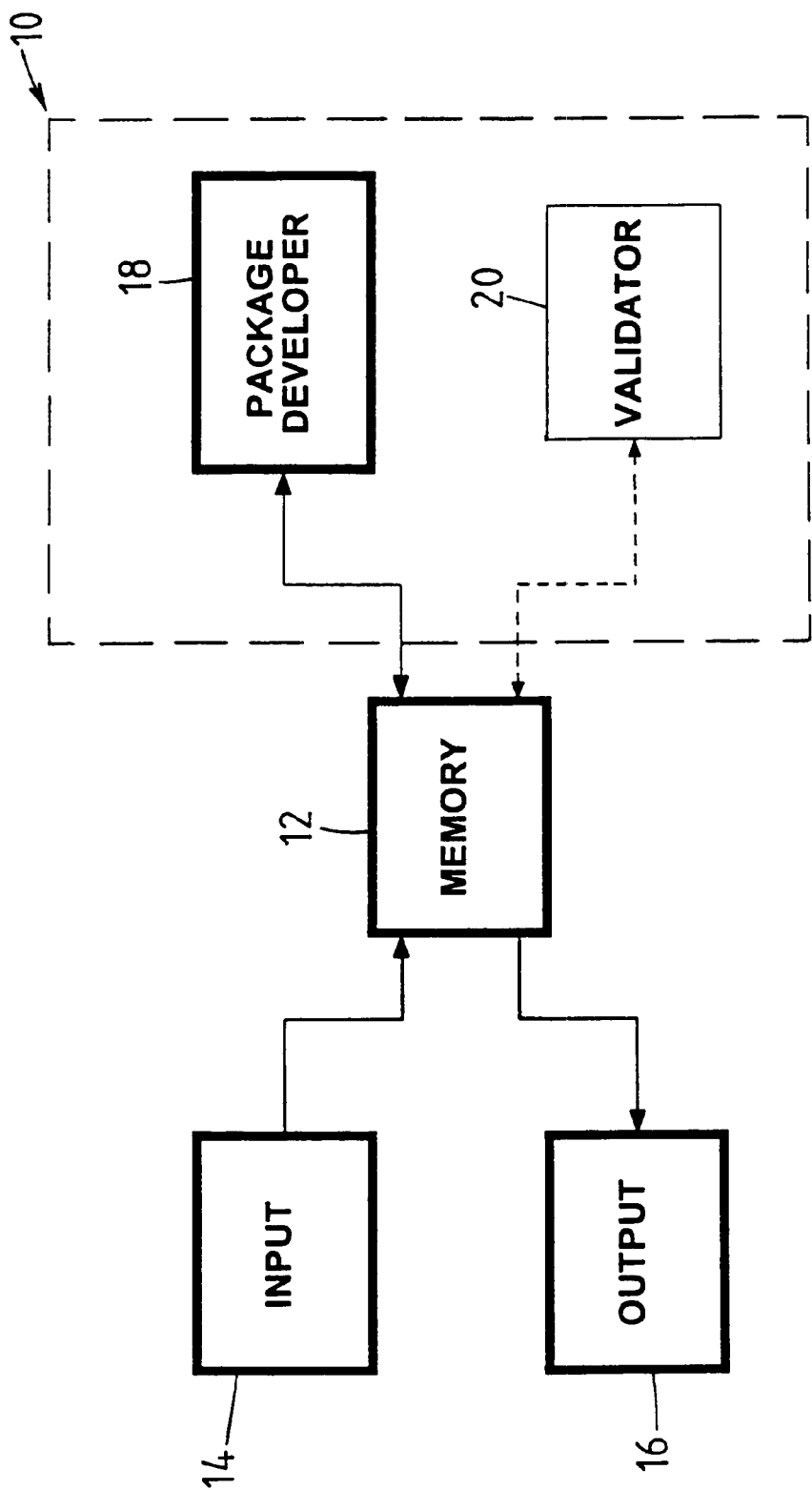
FIG. 1 is a block diagram schematically illustrating an apparatus constructed in accordance with the teachings of the invention.

An apparatus 10 constructed in accordance with the teachings of the invention is illustrated in FIG. 1. As explained in detail below, the disclosed apparatus 10 is capable of automatically developing a package of advertising spots from a plurality of advertising spots offered by a plurality of media suppliers. Although the apparatus 10 is particularly well suited for developing packages of advertising spots for free and/or cable television, persons of ordinary skill in the art will readily appreciate that the apparatus 10 is not limited to use with any particular application or environment of use. On the contrary, the apparatus 10 can be used in connection with any application which would benefit from the features it offers. By way of example, not limitation, the apparatus 10 can be used to automatically select advertising spots for radio, print media, internet advertising, and/or mixed media applications (e.g., simultaneous television and radio buying) without departing from the scope or spirit of the invention.

As discussed in detail below, the apparatus 10 is preferably implemented by software executing on a microprocessor based computer. However, persons of ordinary skill in the art will readily appreciate that all or some of the apparatus can be implemented by hardware and/or firmware without departing from the scope or spirit of the invention.

As shown in FIG. 1, the apparatus 10 is preferably adapted for use with a memory 12. As will be appreciated by persons of ordinary skill in the art, the memory 12 can be implemented in many ways without departing from the scope or spirit of the invention. By way of examples, not limitations, the memory 12 can be implemented by a hard drive, an EEPROM, a SDRAM, or any other data storage medium capable of storing and retrieving data. In any event, the memory 12 is adapted to store a plurality of representations of available advertising spots offered by a plurality of media suppliers. The representations can be configured in any desired data structure, but each preferably includes the following information (shown here in no particular order): (a) an identification of the media supplier; (b) an identification of the associated program; (c) an identification of the cost of the available spot(s); (d) a rating of the program; (e) the length of the available spot; and (f) the date(s) and time(s) of the program. Optionally, item (c) above may be replaced with a CPP (cost-per-point) value or the CPP value can be added to items (a)–(f) without departing from the scope or spirit of the invention.

The manner in which the representations are loaded into memory forms no part of the instant invention and will not be described in detail here. However, persons of ordinary skill in the art will readily appreciate that any conventional method for loading data into memory 12 may be employed including, by way of illustration, not limitation: manual entry; electronic, on-line downloading from one or more source computers maintained, for example, by the media suppliers and/or their sales representatives; and/or electronic downloading from a fixed storage media such as a cd-rom, or a floppy disk supplied in some fashion from, for example, the media suppliers and/or their sales representatives.

To facilitate data entry through one or more of the above methods, the memory 12 is directly or indirectly coupled to one or more conventional input devices 14. The input devices 14 preferably include one or more of the well known, conventional means of inputting data to a personal computer such as, for example, a modem, a disk drive, a cd-rom, a keyboard, a mouse, a touch pad, a serial port and/or a parallel port. To facilitate display of data and other information to the user of the apparatus 10, the memory 12 is directly or indirectly coupled to one or more conventional output devices 16. The output devices 16 preferably include one or more of the traditional means of outputting data and information from a personal computer such as, for example, a monitor or a printer.

The memory 12 is also preferably configured to store a plurality of guideline variables. The guideline variables define the buying guidelines to be followed in purchasing spots for a given media plan. As their name suggests, the guideline variables are preferably assigned values that are changed to suit the media plan being processed. Preferably, all of the guideline variables are user definable. However, in the interest of minimizing excessive data entry during use of the apparatus 10, some or all of the guideline variables are assigned default values which, absent overriding instructions from the user, are used in the process of automatically developing a package as explained below. Additionally, some of the guideline variables can be pre-selected and unchangeable, if desired, without departing from the scope or spirit of the invention. The latter approach is not, however, preferred, since assigning pre-determined, fixed values to any of the guideline variables will inherently reduce the flexibility of the apparatus 10.

As will be appreciated by persons of ordinary skill in the art, the guideline variables of the apparatus 10 preferably include and define the guideline parameters traditionally included in media plans such as those described in the "Background" section above. By way of examples, not limitations, the guideline variables preferably include: (a) one or more minimum ratings per spot per daypart variables (s); (b) a maximum number of spots in a stripped program variable; (c) a starting week variable; (e) a daypart variable; (f) a total GRP per campaign variable; (k) a maximum GRP per daypart variable; (h) a length of spot variable; (i) a maximum GRPs per station per campaign variable; O) a minimum GRPs per station per campaign variable; (k) a maximum GRPs per station per daypart variable; (l) one or more order of daypart package development variable(s); (m) a maximum number of spots in a daytime rotation variable; (n) a percentage of GRPs to be assigned per station variable; (o) a market variable (e.g., Chicago, Los Angeles, etc.); (p) variables identifying targeted percentage(s) of GRPs to be assigned to user specified station(s); (q) a maximum spots per program variable; and/or (r) one or more target GRPs per station variables (for Einstein 1). As will be appreciated by persons of ordinary skill in the art, every one of these variables need not be employed to implement an apparatus in accordance with the teachings of the invention. Indeed, in the example implementation described below which includes three different software models enabling different approaches to automatic packaging, some of these variables are disabled in some of the models. As a result, if an apparatus were constructed implementing only one of the three models, the variables used exclusively for the excluded models would be unneeded and, preferably, excluded.

Returning to FIG. 1, for the purpose of developing a package of available spots based on the guideline variables, the apparatus 10 is provided with a package developer 18. The package developer 18 cooperates with the memory 12 to automatically create a package containing a subset of the representations of available spots stored in memory in accordance with the parameters of the media buying plan defined by the guideline variables. Preferably, the package developer 18 develops the package by sequentially retrieving the most cost effective spot representations from the memory 12 (i.e., the spot with the lowest CPP) and comparing the retrieved representation against the guideline variables. If the retrieved spot does not meet the requirements of the guideline variables, it is discarded and the next most efficient spot is retrieved and analyzed. If a retrieved spot satisfies the guideline variables it becomes a member of the subset forming the package. This process of identifying efficient spots, comparing them against the guidelines, discarding unacceptable spots, and adding satisfactory spots to the package is repeated until the desired number of GRPs in the package (either a daypart package or a campaign package, depending on the implementation) is reached, if possible.

For the purpose of ensuring that the package developed by the package developer 18 is economically acceptable, the apparatus 10 may optionally be provided with a validator 20. When employed, the validator 20 cooperates with the package developer 18 to validate the package which has been created by the developer 18 to ensure that every media supplier associated with the representations in the package supplies a minimum percentage of the spots in the package. The rationale for this validation process lies in bulk discounts. In particular, in some instances, media suppliers may offer discounts to buyers purchasing a threshold number of spots and/or spending a threshold amount of money. The validator 20, thus, serves the important function of ensuring that the package proposed by the package developer 18 is economically efficient when bulk discount opportunities are considered. Preferably, if the validator 20 determines that a given media supplier falls below the minimum percentage, the package developer 18 repeats the above process to develop a second package excluding all spots associated with the given supplier. Preferably, the development of the second package is performed based on the same guideline variables that were used to develop the first package, with the additional parameter that all spots associated with the given supplier be rejected. The process is preferably repeated from the very beginning (i.e., not by merely excluding the spots of the offending supplier from the first package) to ensure the most cost effective spots are selected. The process is also preferably repeated until the package developer 18 creates a package that is acceptable to the validator 20.

Figure 2:
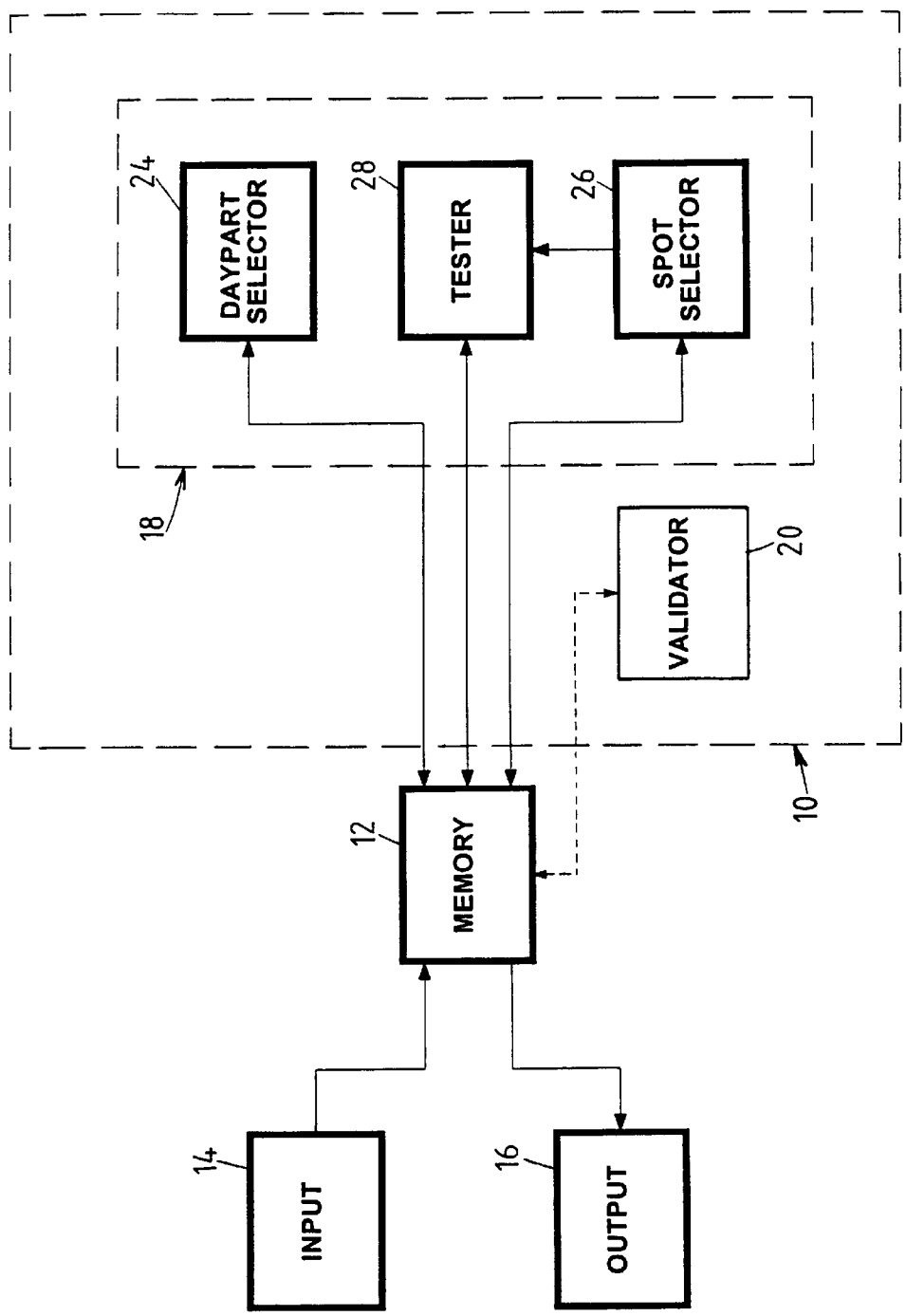
FIG. 2 is a more detailed schematic illustration of the apparatus of FIG. 1.

Since the bulk discount consideration may not always be important to a buyer and/or a buyer may not wish to employ the bulk discount factor in developing the package, the validator 20 is illustrated with light lines in FIGS. 1 and 2 to emphasize its optional nature.

In order to increase the speed with which the package developer 18 develops packages, the package developer 18 preferably includes a daypart selector 24 (FIG. 2). As will be appreciated by persons of ordinary skill in the art, in the typical instance, the memory 12 will include a large number of representations of available spots. While the package developer 18 could be configured to compare every spot representation in the memory 18 against multiple ones of the guideline variables to develop a package without departing from the scope or spirit of the invention, such an approach would tend to be inefficient. To avoid such inefficiency, the package developer 18 is preferably provided with the daypart selector 24 which, before examining the majority of the guideline variables, develops a sub-set of available spots from the plurality of available spots by calling out all of the spots in a daypart to be packaged as identified in the guideline variables. In other words, the daypart selector 24 cooperates with the memory 24 to create a shortened list of available spots (namely, those spots in a given daypart) for further examination against the guideline variables. In embodiments wherein only spots in one selected daypart are to be packaged, considerable gains in processing time are achieved as spots outside the selected daypart are immediately discarded before CPP searching begins. In embodiments where spots across multiple dayparts are to be packaged, even greater gains in processing time are achieved for the same reason. However, although it is presently believed that culling spots out by daypart before CPP searching begins is advantageous, persons of ordinary skill in the art will appreciate that daypart screening can be performed at other times without departing from the scope or spirit of the invention.

Preferably, upon completion of its screening function, the daypart selector 24 passes the list of available spots in the subject daypart to a spot selector 26. Persons of ordinary skill in the art will readily appreciate that, although this transfer of data can occur directly between the daypart selector 24 and the spot selector 26 without departing from the scope or spirit of the invention, in the preferred embodiment the data transfer is effected indirectly by writing and reading data to and from the memory 12.

In any event, the purpose of the spot selector 26 is to develop the package of available spots from the set created by the daypart selector 24. In particular, as shown in FIG. 2, the spot selector 26 cooperates with the memory 12 to select spots from the set developed by the daypart selector 24 for possible inclusion in the package. Preferably, the spot selector 26 selects the spots in the subject daypart list based on their CPPs.

For the purpose of excluding spots that do not completely satisfy the subject guideline variables from the package, the package developer 18 includes a tester 28. As shown in FIG. 2, the tester 28 cooperates with the spot selector 26 to exclude spots from the package based on criteria defined by the guideline variables. As persons of ordinary skill in the art will readily appreciate, the spot selector 26 can be configured to sort the entire daypart list developed by the daypart selector 26 by CPP, or to sequentially search for the spot in the daypart list with the lowest CPP value on an as needed basis (i.e., search for a spot, pass it to the tester, search for another spot, if needed, pass it to the tester, etc.) without departing from the scope or spirit of the invention. Regardless of the sorting technique selected, the tester 28 sequentially tests the spots selected by the spot selector 26 against the guideline variables until some criteria specified in the guideline variables is met. This criteria can be, for example, the maximum number of GRPs to be obtained in the daypart, the maximum number of GRPs to be obtained in the campaign, the maximum number of GRPs to be assigned to each supplier, and/or the depletion of possible spots from the subset. When the criteria is met, the tester 28 excludes all remaining untested spots (if any) from the package. The package is then stored in the memory 12. If the validator 20 is employed, it can then access the package in memory 12 to test it against the bulk discount criteria as discussed above.

In some embodiments, the daypart selector 24 creates two or more sub-sets of available spots from the representations stored in the memory 12. Each of these sub-sets corresponds to one of the dayparts. In these embodiments, the spot selector 26 and the tester 28 cooperate to develop the package from an of the dayparts specified in the guideline variables. Preferably, the spot selector 26 and the tester 28 will search and select spots from the daypart sets developed by the daypart selector 24 on a daypart by daypart basis in an order specified in the guideline variables. For example, the spot selector 26 and the tester 28 might complete searching and testing the "Late Fringe" daypart before starting to search the "Early Morning" daypart, and might complete searching and testing the "Early Morning" daypart before searching and testing the "Early News" daypart, because such an order was specified in the guideline variables. Preferably, the order in which the dayparts are searched is user definable. While completing packaging on a daypart by daypart basis as described above is presently preferred, persons of ordinary skill in the art will readily appreciate that spots could be selected and tested on a CPP basis without regard to their dayparts without departing from the scope or the spirit of the invention. In either event (daypart by daypart processing or processing across all dayparts simultaneously), the spot selector 26 and the tester 28 continue processing spots until a criteria defined in the guideline variables is met. As mentioned above, this criteria may be, for example, the passing of a threshold sum of gross rating points to be purchased for a daypart, the passing of a threshold sum of gross rating points to be purchased for a campaign, the maximum number of GRPs to be assigned to each supplier, and/or the depletion of possible spots from the subset.

Although FIG. 2 shows a direct connection between the spot selector 26 and the tester 28, persons of ordinary skill in the art will readily appreciate that, although possible, spots selected by the spot selector 26 need not be directly passed to the tester 28. Instead, they may be indirectly passed through the memory 12 as is presently preferred. Persons of ordinary skill in the art will further appreciate that, although any or all of the package developer 18, the validator 20, the daypart selector 24, the spot selector 26 and/or the tester 28 could be implemented by hardware or firmware, in the presently preferred embodiment they are implemented by software routines.

Person of ordinary skill in the art will appreciate that media buyers sometimes enter into contractual arrangements whereby they agree to place a certain percentage of GRPs on certain types of buys they make with certain media suppliers. These arrangements typically call for the subject supplier to provide preferred rates. In such instances, it is desirable to adjust the apparatus 10 to develop a package that satisfies these contractual obligations. To this end, the apparatus 10 is preferably configured to accept supplier percentage variables as part of the guideline variables. The supplier percentage variables define a percentage of GRPs to be purchased from each media supplier in a set of media suppliers (which may or may not include all of the media suppliers) in the subject media with available spots. In such embodiments, the tester 28 is configured to exclude spots from the package based on the supplier percentage variables (as well as the other guideline variables) such that the completed package contains spots from the media suppliers apportioned in the percentages defined by the supplier percentage variable. Preferably both the supplier percentage variables and the media suppliers in the set of media suppliers is user definable.

Features and advantages of the apparatus 10 will now be discussed in the context of a flow chart (FIGS. 3A–3M) and screen prints or displays (FIGS. 4–14, and 16–17) illustrating a more concrete example of an apparatus 10 constructed in accordance with the teachings of the invention. As will become clear from the following, the software comprising the apparatus 10 includes three distinct models of operation, referred to herein as Einstein 1, Einstein 2 and Einstein 3. The software is implemented such that the user can select between these three models to automatically develop a package of advertising spots from a plurality of advertising spots stored in a memory 12.

The Einstein 1 model is the simplest model. It packages a single daypart (selected by the user). Under the Einstein 1 model, the user defines a target GRP % for each section to be packaged to enable comparison between possible packages. The Einstein 2 model creates packages across multiple dayparts. The user defines a maximum percentage of the total GRPs that may be assigned to each supplier per daypart and per the entire campaign. Einstein 2 creates the most efficient package based on these parameters. Einstein 3 is similar to Einstein 2. However, in Einstein 3, the user assigns fixed target percentages on a station by station basis (the sum of which should be 100% of the total GRPs). Einstein 3 then develops a package across multiple dayparts that meets the predefined supplier allocation designated by the buyer.

Figure 3A:
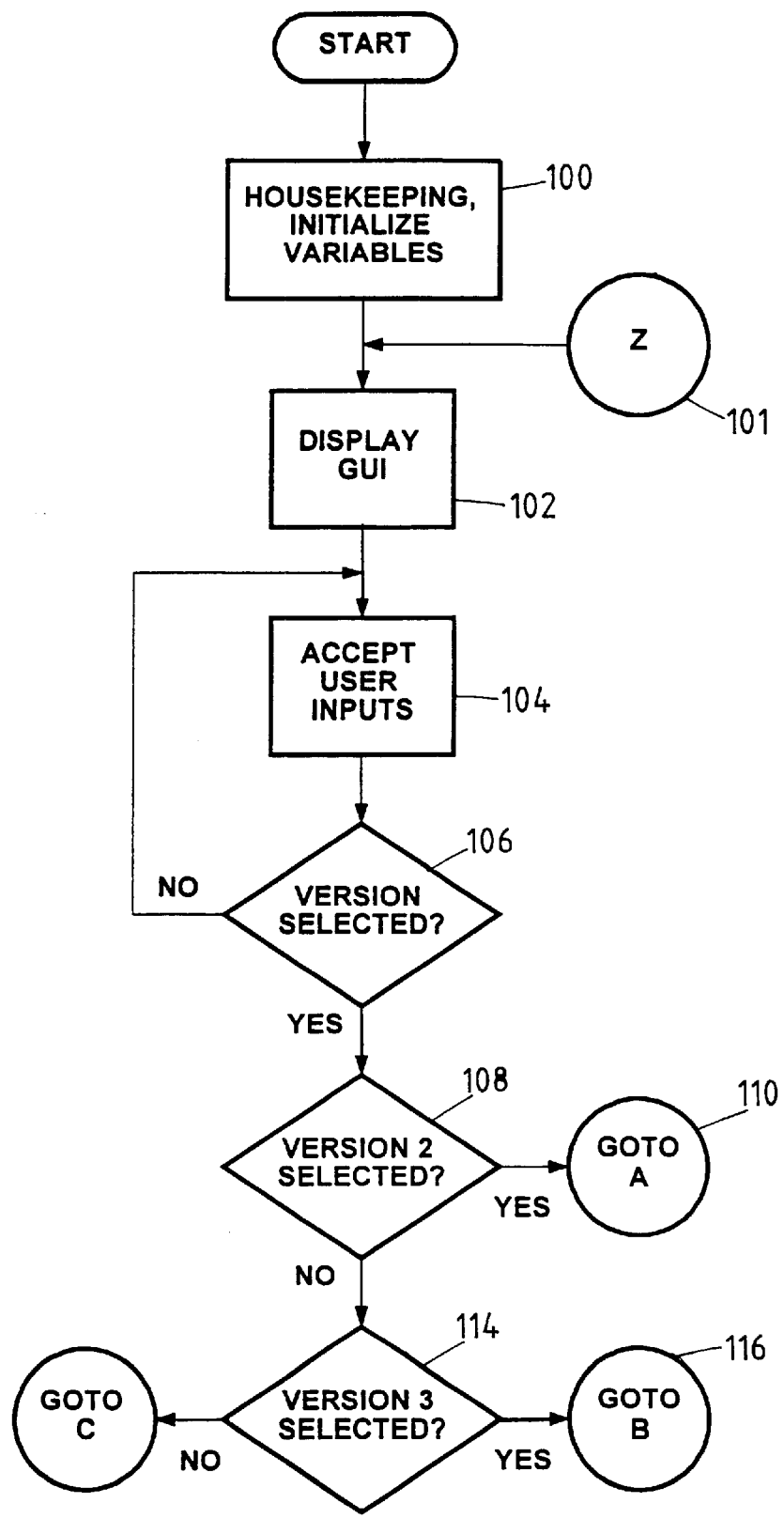
Figure 4:
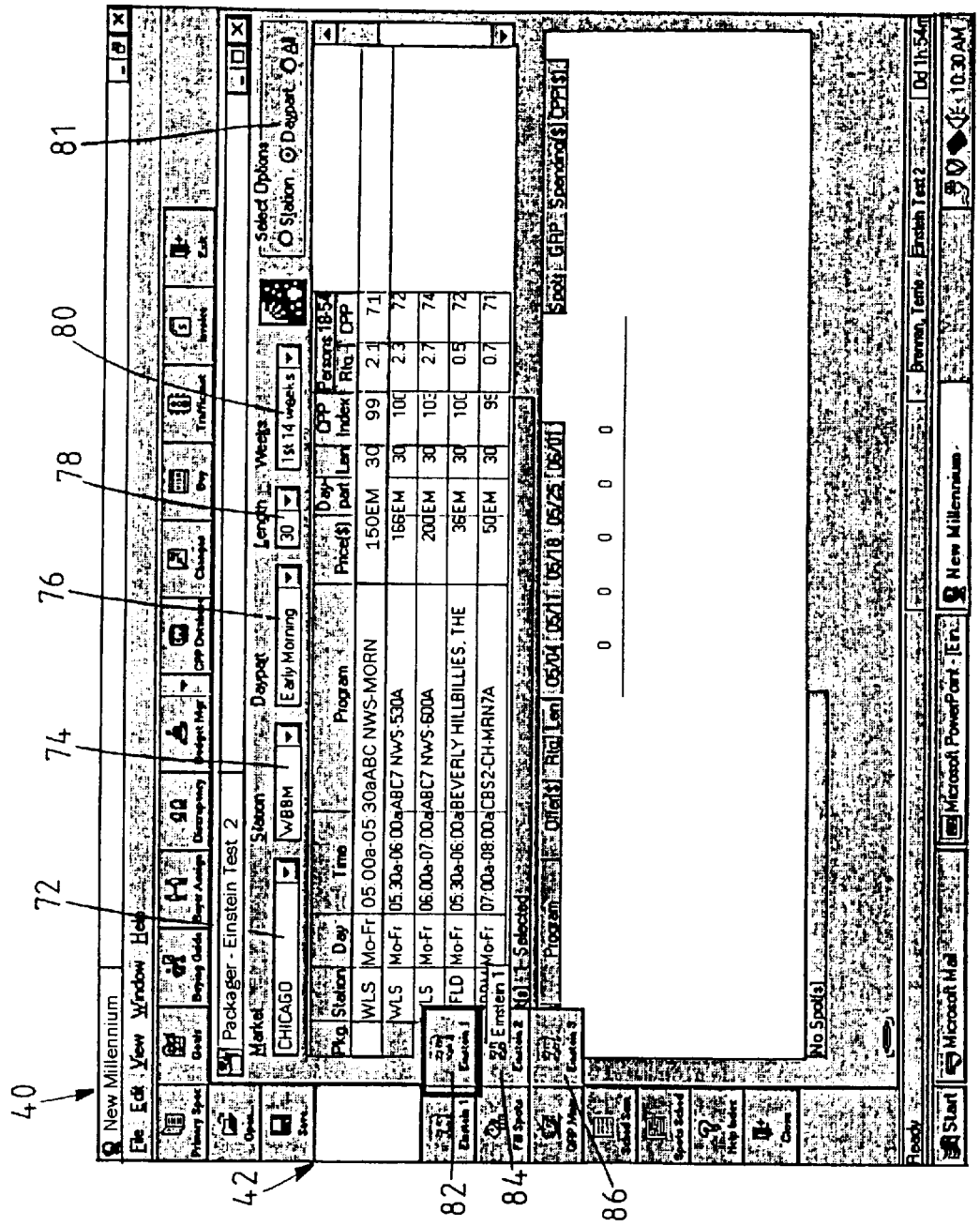
FIG. 4 is a screen print of an exemplary graphical user interface implemented by the program of FIGS. 3A–3M.

Turning to FIG. 3A, at start-up the software performs certain conventional housekeeping techniques including, by way of example, not limitation, setting system variables, loading software modules into memory, etc. (block 100). Once the housekeeping tasks are performed, a graphical user interface 40 is displayed (block 102). An exemplary graphical user interface 40 is shown in FIG. 4 in a format compatible with Microsoft's Windows 95™. Although the examples shown here illustrate the software executing in a Windows 95™ environment, persons of ordinary skill in the art will readily appreciate that the disclosed software can be adapted for use with other operating systems without departing from the scope or spirit of the invention. In any event, once the graphical user interface 40 is displayed, the logic enters a loop (blocks 104–106) wherein it accepts and stores user inputs (block 104). The logic remains in this loop until one of the three models (e.g., Einstein 1, Einstein 2, or Einstein 3) is selected.

As shown in FIG. 4, the graphical user interface 40 is preferably adapted to include a perimeter toolbar 42 including various icons representative of buttons. By using a conventional "point and click" device such as a mouse, or less conveniently, by using coded keystrokes, a user can select any of the illustrated buttons to perform system functions associated with the buttons. (It will be understood throughout this document that pointing and clicking with a mouse can also be effected via coded keystrokes as is conventional in the GUI art.)

Selecting the "Primary Spec" icon produces a window where the user may enter advertising campaign information such as client, brand, weeks of advertising, budget, demographic target and other basic information required for the media buyer to determine how best to make the media buy.

Selecting the "Goals" icon produces a window that enables the user to enter the daypart, length of commercial and the number of GRPs per week that the buyer must fulfill in making their buy. The Einstein models "take" one week's worth of GRPs into account and fulfills the weekly GRPs needed according to their logic.

Selecting the "Buying Guide" icon produces a window that enables the user to check the guidelines for selecting the individual commercial spots.

Selecting the "Buyer Assign" icon produces a window that enables the media supervisor to assign market buys to individual media buyers. For example, the New York market is assigned to the New York media buyer, the Los Angeles market is assigned to the L.A. buyer, etc. In turn it is the media buyer who uses Einstein to determine the best package of spots to buy in their market.

Selecting the "Discrepancy" icon produces a window entitled "Discrepancy Workshop" where the media buyer solves billing discrepancies electronically. By way of background, after the media buyer places an order (buys) the spot TV schedule that Einstein helps put together, the TV stations obviously air commercial in the time slots that were ordered. On a monthly basis, the TV stations send invoices for the spots that aired at the costs that were agreed upon between buyer and seller. Occasionally, a rate on the invoice is different from a rate on the media buyers records. This difference produces a billing discrepancy that only the media buyer can resolve. When a billing discrepancy is detected by the New Millennium invoice reconciliation module, the discrepancies (list of spots that do not match the ordered spots) are displayed on this window.

Selecting the "Budget Mgr." icon produces a window that enables the media supervisor to keep track of the amount of money each of the media S buyers spends to complete their media buys. It works like a spreadsheet, with each media buyer's "spending" appearing as the ordered spots are confirmed by the station resulting in the "Buy" being completed.

Selecting the "CPP Database" icon produces a screen that enables the supervisor to estimate CPPs for the future media plans based on past media buys completed by the Einstein logic.

Selecting the "Changes" icon produces a window that enables media buyers to process preempted spots and 'makegood' spots as they occur at each station. For example, on occasion an ordered spot is preempted (does not air) due to a major news event. In such a case, the TV station sales person will call the media buyer, identify the preempted spots and offer a 'makegood' for it. The media buyer can determine whether they want to accept the makegood by checking the rating of the makegood spot to make sure it is equal to the rating of the preempted spot, and also that it costs the same amount of money. The 'Changes' section enables the buyer to perform this function while at the same time recording the change, so that it will be reflected as part of the media buy.

Selecting the "Buy" icon produces a window that is used by the media buyers after the spots have been ordered from the TV station. Typically, after the spots have been ordered, there are several tasks that must be performed: (1) the station sends a contract listing the spots that have been ordered which the media buyer must check against her/his order; (2) the media buyer or supervisor must issue reports to their client showing the spots ordered and comparing the attained GRPs with the 'goal' GRPs; and (3) a current media schedule must be maintained reflecting preemptions and makegoods, if they occur. All three of these functions can be performed by the media buyer within the 'Buy' window.

The "Traffic" icon is preferably eliminated from this screen. Its functionality is preferably replaced by a software module called New Millennium Traffic. The functionality of the traffic module is to facilitate an agency traffic manager sending TV commercials to each of the TV stations from which media buyers ordered spots. The stations must be told which commercial to air in which spots. The traffic manager performs this function.

The "Invoice" icon is preferably eliminated from this screen. Its functionality is preferably replaced with a software module called Invoice Reconciliation or Media Control System (MCS). The functionality of this module is to reconcile TV station invoices with the spot TV order placed by the media buyer.

Selecting the "Exit" icon results in the user exiting the program.

The "Open" icon is selected to open a new file.

The "Save" icon is selected to save contents of the current screen.

The "Fill Spots" command enables the buyer to copy the number of spots in a program to all succeeding weeks in a campaign.

The "GRP Mntr." command produces a number of "analysis reports" showing how the media buy fulfills the GRPs goals as expressed in the goals section. Media buyers use this screen to determine if they have met their goals.

The "Sched Sum" command produces reports that summarize all spots in the campaign.

The "Spots Sched" command produces schedule reports that list all the spots aired in terms of programs, time, day, rating, etc.

The "Help Index" icon produces a help menu to enable users to locate functional help online.

The "Close" icon is selected to close this window.

As also shown in FIG. 4, the "window" portion of the graphical user interface 40 includes several drop down menus. In particular, the interface 40 includes a market menu 72, a station menu 74, a daypart menu 76, a spot length menu 78 and a weeks menu 80. By "clicking" on the appropriate one of these menus, the user is provided with a list of possible inputs to choose from in preparing to develop a package. For example, after selecting the market menu 72, the user is provided with a list of markets serviced by the apparatus 10. Once a market is selected in menu 72, the station menu 74 defaults to a list of television media suppliers in the selected market. The daypart menu 76 can be used to identify a particular daypart for processing. The length menu 78 and the week menu 80 are respectively used to identify the length of spots (e.g., 15 sec., 30 sec., 60 sec.) to be purchased and the time of the year the purchased spots are to run.

As shown in FIG. 4, the graphical user interface 40 also includes a "select options" menu 81. This menu enables the user to pick the type of packaging he/she wishes to perform, namely, by station, by single daypart or by all dayparts. Selecting 'station" enables the buyer to view only those spots or avails on a single station. This feature is most useful when the buyer has put together a media package (either by hand or by using Einstein 1, 2 or 3) and then wants to view only those spots on a particular station which would appear scheduled across the weeks in the lower portion of the window. Selecting "daypart" enables the Einstein 1 model. Selecting the "all" option from the menu enables the Einstein 2 and Einstein 3 models. The enabling of the various models is visually indicated to the user by the coloration of the Einstein 1, Einstein 2 and Einstein 3 buttons 82, 84, and 86 on the lefthand side of the interface 40.

Figure 3B:
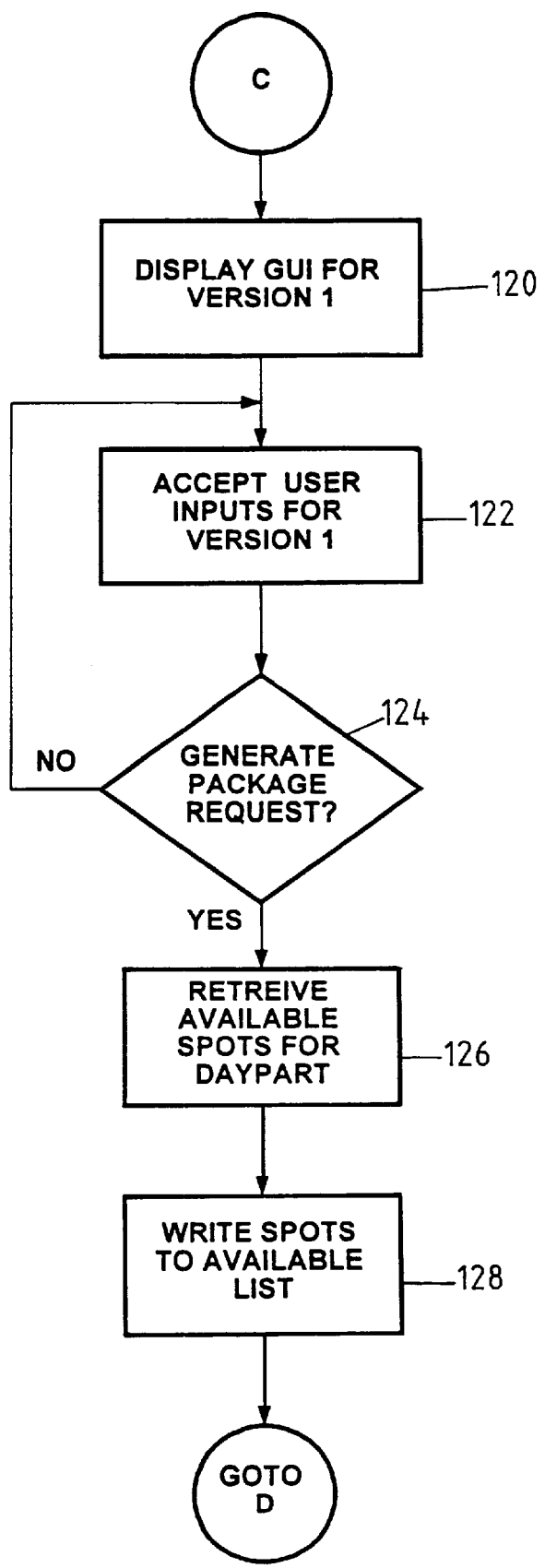

Returning to FIG. 3A, once a user selects a model (block 106), the logic determines which version has been selected. If Einstein 2 has been selected (block 108), control jumps (block 110) to block 112 in FIG. 3G. If Einstein 3 is selected (block 114), control jumps (block 116) to block 118 of FIG. 3G. If the simplest model, Einstein 1 (package by daypart), is selected, control proceeds to block 120 (FIG. 3B).

Figure 5:
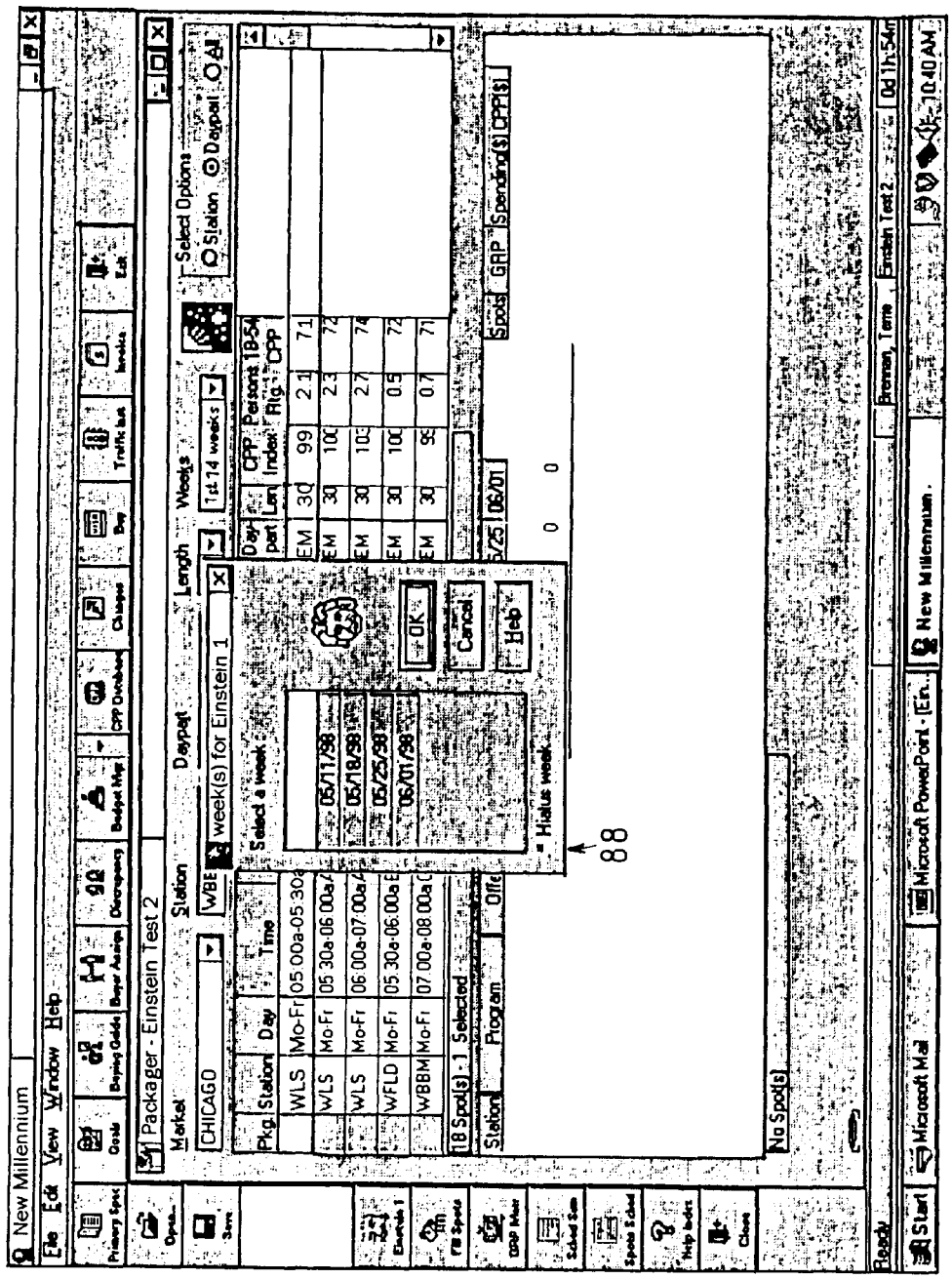
FIG. 5 is a view similar to FIG. 4 but showing an exemplary graphical user interface for selecting weeks in the program illustrated in FIGS. 3A–3M.

Assuming for purposes of illustration that Einstein 1 is selected, the user is then asked to select a week to package via a graphical window 88 (FIG. 5). Once a week is selected, the Einstein 1 graphical user interface 90 (FIG. 6) is displayed (block 120). Control then loops between blocks 122 and 124 accepting user inputs until either the "Generate" icon 92 or the "close" icon 94 is selected. (In the interest of brevity, the various quit options are not shown in the flowchart. It will be understood, however, that selecting "close" will return the user back to block 101 in FIG. 3A where the interface 40 shown in FIG. 4 will again be displayed).

Figure 6:
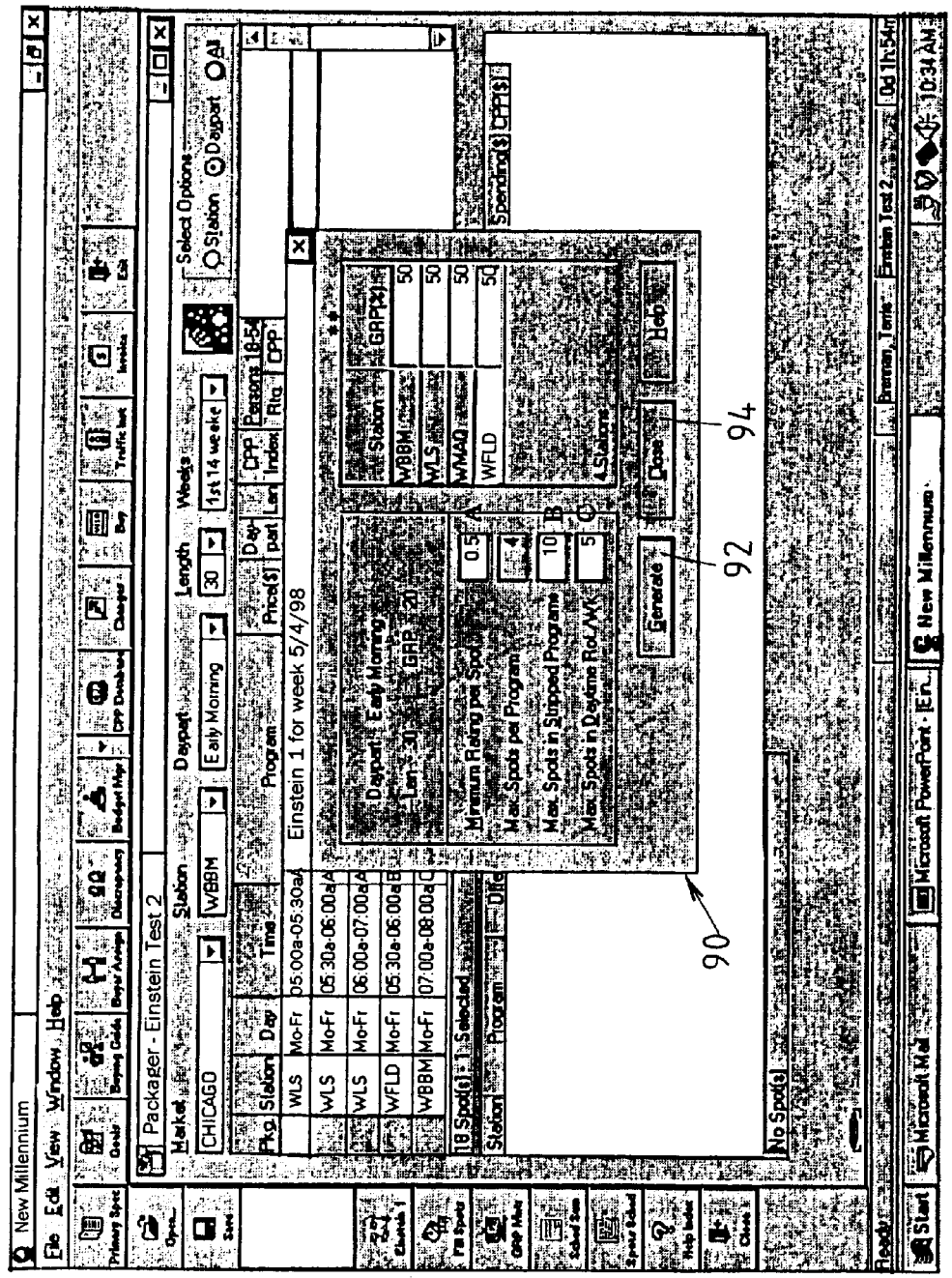
FIG. 6 is a view similar to FIG. 5 but showing an exemplary graphical user interface for selecting the daypart controls for a first week to be processed.

As shown in FIG. 6, the Einstein 1 interface 90 enables the user to enter various guideline variables. For example, the user is given the opportunity to set the minimum rating per spot variable, the maximum number of spots in a stripped program variable and the maximum number of spots in a daytime rotation variable. By way of explanation, some programs run five days per week. Thus, these programs provide an opportunity to place more than one ad in the same program per week. The maximum spots in a stripped program variable gives the buyer an opportunity to limit the number of spots in such a stripped program that can be selected in a one-week period. Similarly, some programs such as soap operas are packaged and sold together as a "daytime rotation". The maximum spots in a daytime rotation variable 100 enables a user to set a limit on the number of spots Einstein 1 will package in a given rotation.

A feature of Einstein 1 that is not available in Einstein 2 and 3 is the ability to define the percentage of the planned GRPs that should be allocated per supplier by entering values in a GRP (%) variable associated with each supplier. As shown in FIG. 6, the user can apportion more than 100% between the stations to enable comparisons of possible packages as explained below.

As shown in FIG. 6, some of the variables in the interface 90 are automatically filled-in from the guideline variables entered with the media plan (see, for example, the maximum spots per program variable which is not "lighted" in FIG. 6). Although shown darkened in FIG. 6, these variables can be overridden with new values by pointing and clicking to that variable with a mouse or the like.

After the user enters all desired variables, to generate a package the user simply selects the "generate" icon 92 (block 124). Control then proceeds to block 126 (FIG. 3B). The code constituting the daypart selector 24 then retrieves all of the available spots for the daypart identified by the user's selection in daypart menu 76 (FIG. 4) from the collection of available spots stored in the memory 12. It then writes the retrieved spots in a list referred to herein as the available list (block 128). The available list typically includes a subset of the representations of available spots in the memory. However, if all of the spots in memory happen to be associated with the subject daypart, the available list will include all of the spots in memory. Similarly, if no spots are available in the daypart, the subset constituting the available list will be a null set. Persons of ordinary skill in the art will readily appreciate that, although the apparatus 10 can be adapted to retrieve and write spots to a separate location in memory 12 forming the available list, the available list can also be created or "written" by simply setting a flag to a predefined value in an available list field associated with the representations stored in the memory 12 without departing from the scope or spirit of the invention. The latter approach has the advantage of reducing the quantity of data moved within the memory 12. Persons of ordinary skill in the art will readily appreciate that, if the former approach to creating the available list is pursued, the retrieval of data from the memory 12 for inclusion in the available list preferably does not remove the original data stored in the memory (i.e., a copy is retrieved, but the original remains intact) to permit subsequent searching of the same database.

Figure 3C:
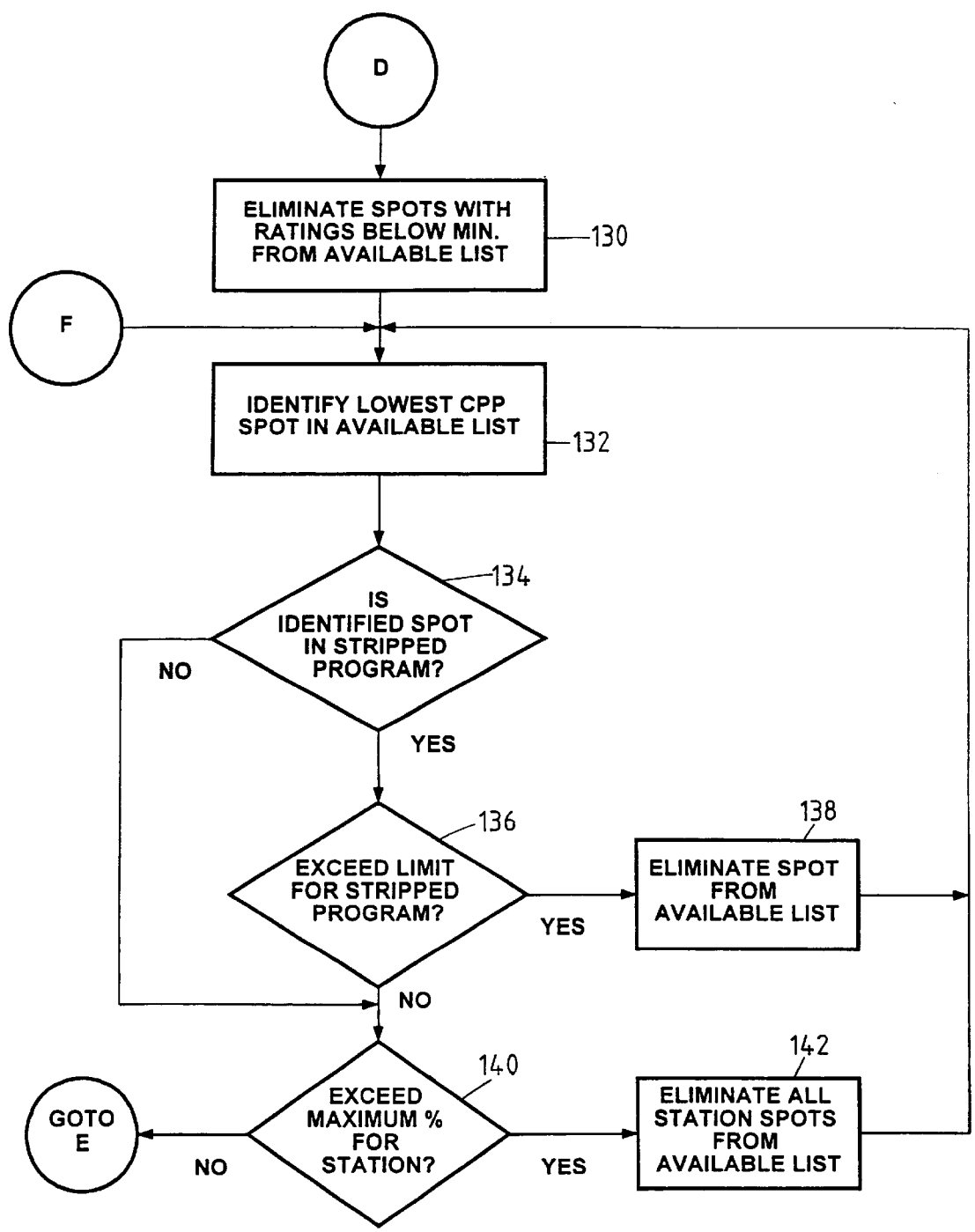

In any event, after the available list is completed, control proceeds to block 130 (FIG. 3C). At block 130, all of the available spots with ratings below the minimum acceptable rating level defined in the guideline variables are removed from the available list. The code implementing the spot selector 26 then searches the available list for the spot in the list with the lowest CPP (block 132). As mentioned above, this step can be performed on an "as needed" basis where a search is conducted and the lowest CPP spot is identified, or by sorting the entire list by CPP and storing the sorted list for subsequent accesses without departing from the scope or spirit of the invention. In addition, persons of ordinary skill in the art will appreciate that, in some instances, two or more spots will have the same CPP value. Selection between spots with the same CPP value can be performed in many ways without departing from the scope or spirit of the invention. In the present embodiment, selection between spots from different programs with the same CPP is performed by selecting the spot with the highest rating first. In other words, in the event of a "CPP tie", the tie breaker is the spot with the highest rating.

In any event, after the spot selector 26 identifies and selects the lowest CPP spot, the tester 28 begins to test the selected spot against the remaining guideline variables which are operable in Einstein 1. Thus, at block 134, the code implementing the tester 28 views the appropriate portion of the representation of the selected spot to determine if the selected spot is part of a stripped program. If it is not, control proceeds to block 140. Otherwise, the logic determines whether the maximum number of spots for that stripped program (as defined for stripped programs generally in the guideline variables) would be exceeded by packaging the spot. If so, the spot is eliminated from the available list (block 138) and control returns to block 132 where the spot with the next lowest CPP (or, in the event of multiple spots with the same CPP, the next spot with the same CPP) is passed to the tester 28 so that the testing cycle can begin again. Persons of ordinary skill in the art will appreciate that, once the limit of spots for a particular stripped program defined in the guideline variables has been reached, no further spots in that program will be selected. Thus, the packaging process can be expedited by eliminating all of the remaining spots in the subject stripped program from the available list at block 138 as soon as the threshold is met or exceeded without departing from the scope or spirit of the invention.

Returning to FIG. 3C, if the spot selected is not in a stripped program (block 134) or the selection of the spot would not exceed the limit for the associated stripped program (block 136), control proceeds to block 140. At block 140, the logic determines whether adding the spot to the package would exceed the maximum percentage of the total GRPs that the guideline variables have defined as acceptable for the associated media supplier. If so, all of the spots remaining in the available list that are associated with the subject supplier (including the current spot) are eliminated from the available list (block 142) and control returns to block 132 where the next spot is selected from the available list.

Figure 3D:
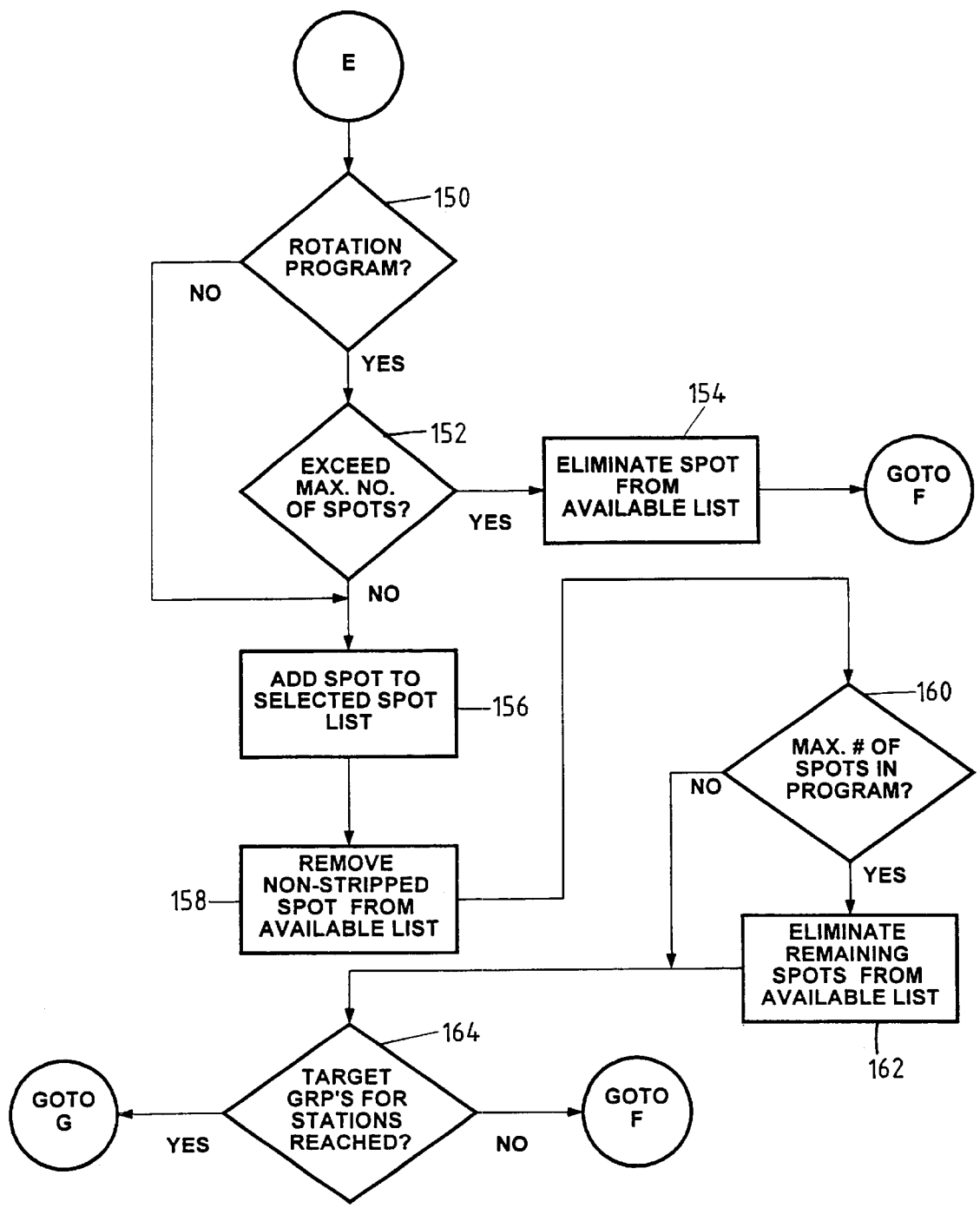

If packaging this spot does not exceed the maximum supplier percentage of GRPs defined in the guideline variables (block 140), control proceeds to block 150 (FIG. 3D). At block 150, the tester 28 views the appropriate portion of the data structure representation of the selected spot to determine whether the spot is associated with a program in a daytime rotation. If not, control proceeds to block 156. Otherwise, control proceeds to block 152. At block 152, the logic determines whether packaging the subject spot would violate the guideline variables' limit on the maximum number of spots that can be purchased in a daytime rotation. If the limit would be violated, the current spot and, preferably, all other unpackaged spots associated with the subject daytime rotation remaining in the available list, are eliminated from the available list (block 154). After such elimination, control returns to block 132 (FIG. 3C) where testing of the next available spot can begin.

Returning to FIG. 3D, if the currently selected spot is not associated with a daytime rotation (block 150), or selecting the spot would not exceed the maximum number of spots for that rotation permissible under the guideline variables (block 152), control proceeds to block 156. At block 156, the subject spot is added to the selected spot list. As with the available list, persons of ordinary skill in the art will appreciate that the selected spot list can be created by making a separate copy of the subject spots or by setting an appropriate flag in the data structure associated with the spot in memory 12 (either in the available list or the original database of representations in the memory 12) without departing from the scope or spirit of the invention.

After the spot is added to the selected spot list (block 156), the spot is removed from the available list to ensure that same spot is not packaged more than once (block 158). Control then proceeds to block 160.

At block 160, the logic consults the guideline variables to determine whether the maximum number of spots in the program associated with the last added spot has been reached. If so, all remaining spots associated with that program are eliminated from the available list (block 162). If the maximum number of spots for that program has not been reached (block 160), or after the remaining spots associated with the program have been eliminated (block 162), control proceeds to block 164.

At block 164, the logic determines whether the target GRPs for each station (as defined by the user via interface 90) have been reached. If not, control returns to block 132 (FIG. 3C) where the next spot can be selected. If the target number of GRPs have been assigned to each station, control proceeds to block 170 (FIG. 3E).

Figure 3E:
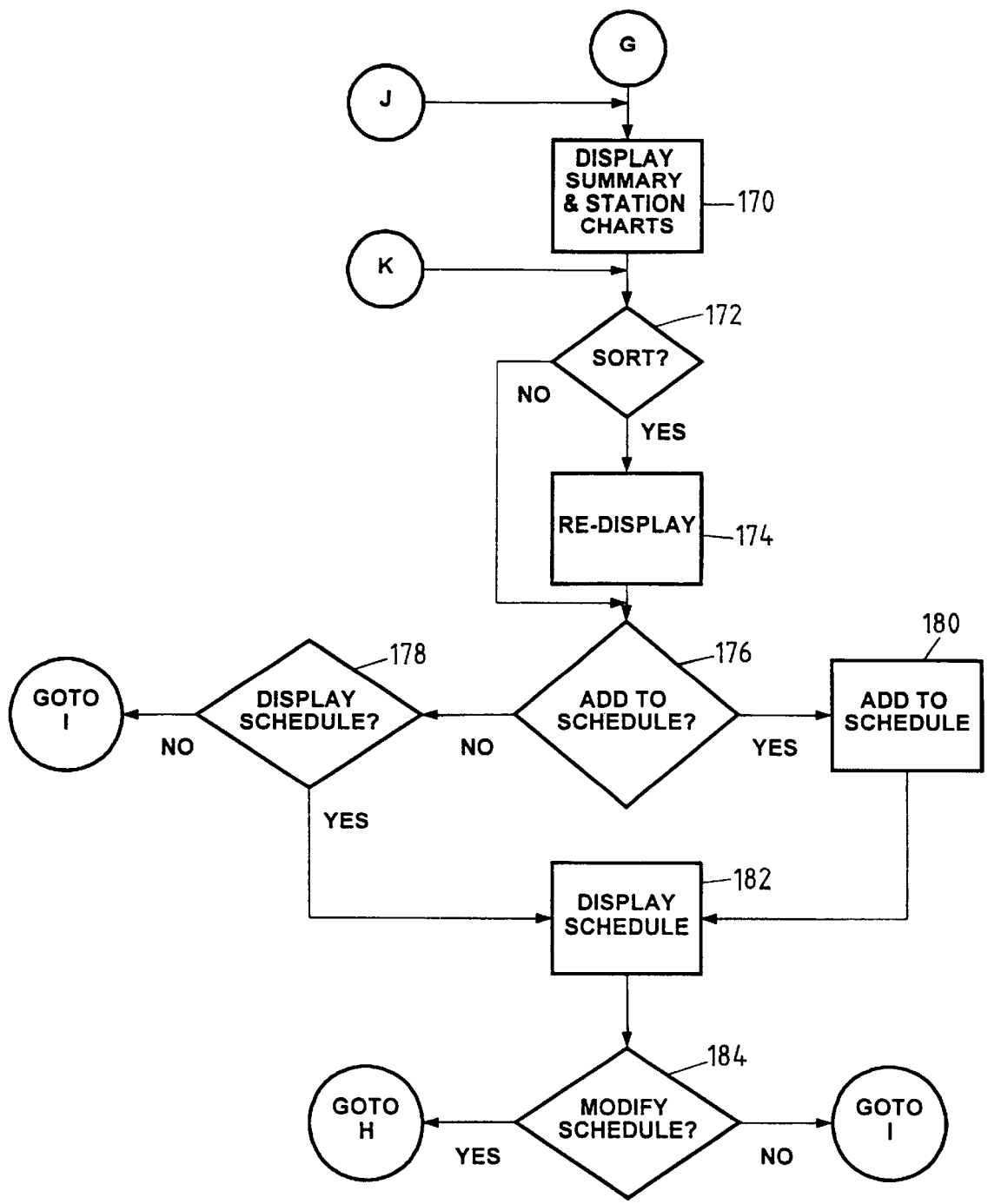
Figure 3F:
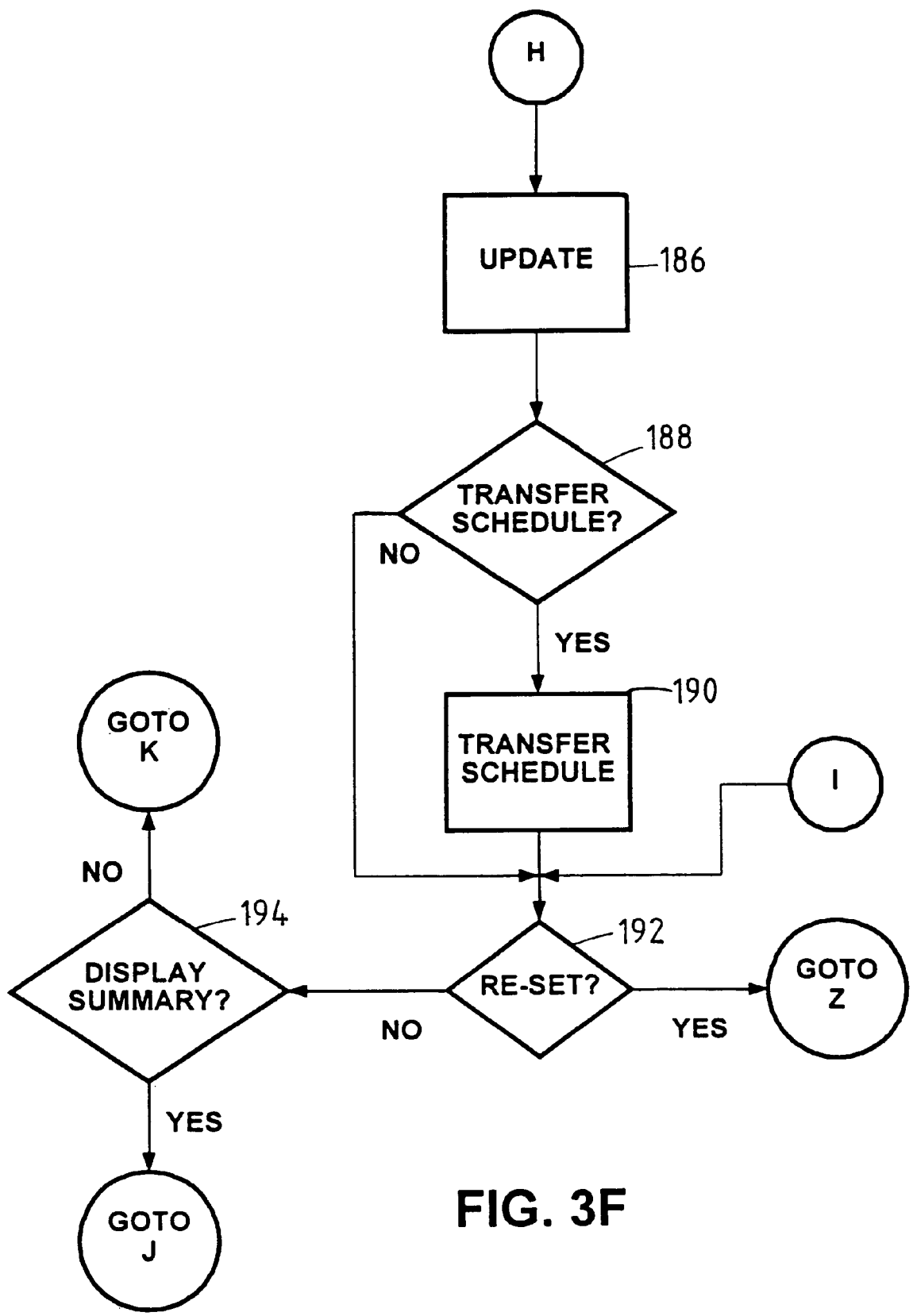

Before turning to FIG. 3E, it should be noted that, in some instances the logic will reach block 132 (FIG. 3C) with no remaining spots in the available list. Although not explicitly shown in the flow chart, when this condition occurs, the logic jumps out of the loop defined by blocks 132–164 and proceeds to block 170 (FIG. 3E).

Whether reaching block 170 from block 132 or from block 164, at block 170 the logic displays a summary or comparison chart and individual supplier package charts illustrating the packages developed by the Einstein 1 logic. An exemplary comparison chart 800 and an exemplary supplier package chart 802 are respectively illustrated in FIGS. 7 and 8.

Figure 7:
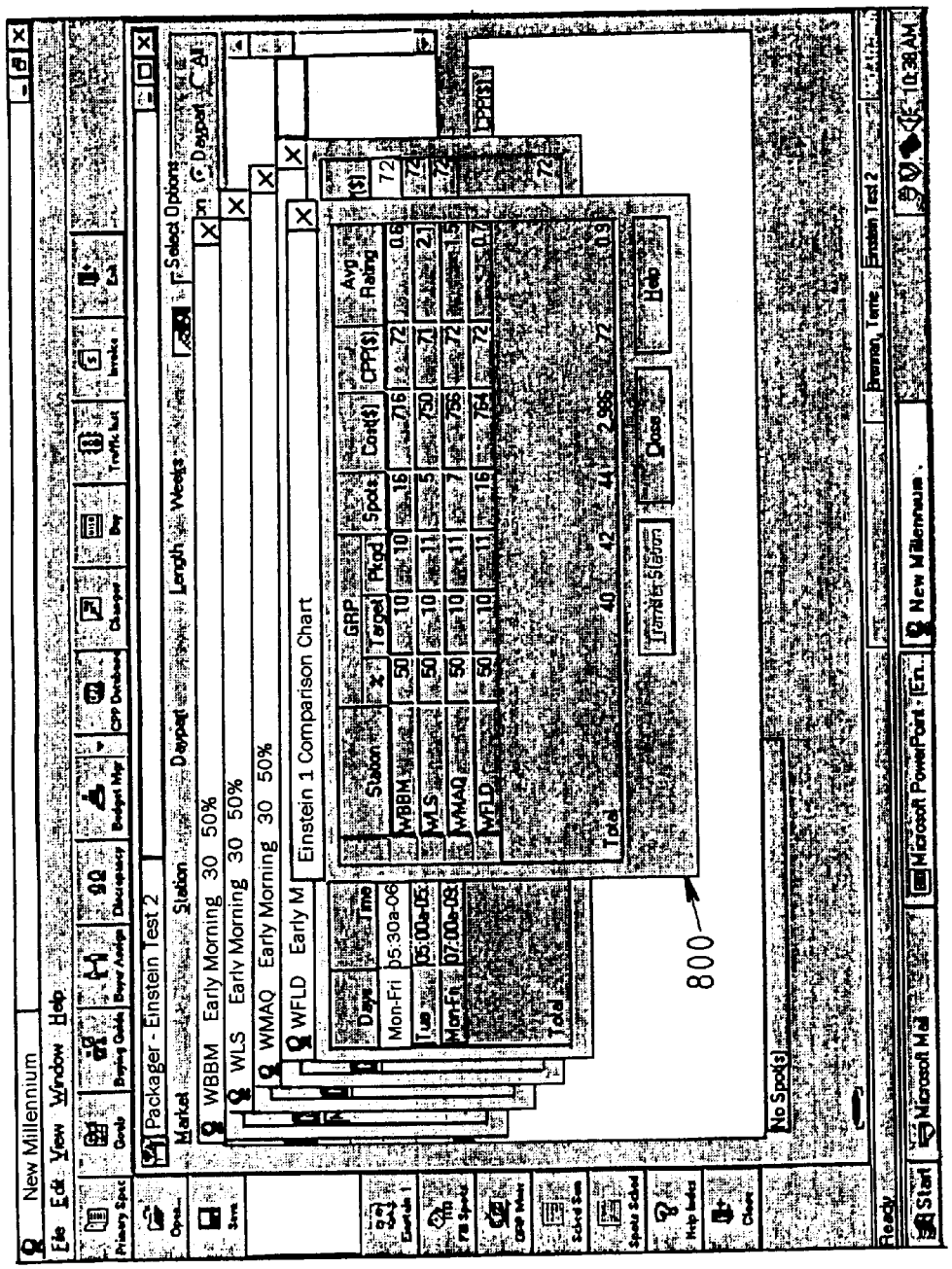
FIGS. 7–8 are views similar to FIG. 4 but showing exemplary summary and station charts generated by the Einstein 1 routine.

As shown in FIG. 7, the comparison chart 800 displays significant information about each media supplier package in a side-by-side comparison. For example, for each supplier the comparison chart 800 displays: (a) the percentage of total GRPs for the daypart the user targeted for the supplier; (b) the target number of GRPs the user set for the supplier; (c) the number of GRPs assigned to the station in the package developed by Einstein 1; (d) the number of spots in the package for the supplier; (e) the cost of the package; (e) the CPP for the package for the supplier; and (f) the average rating of the spots in the package. The totals for each of these categories summed across all stations are also preferably displayed at the bottom of the summary chart 800.

Figure 8:
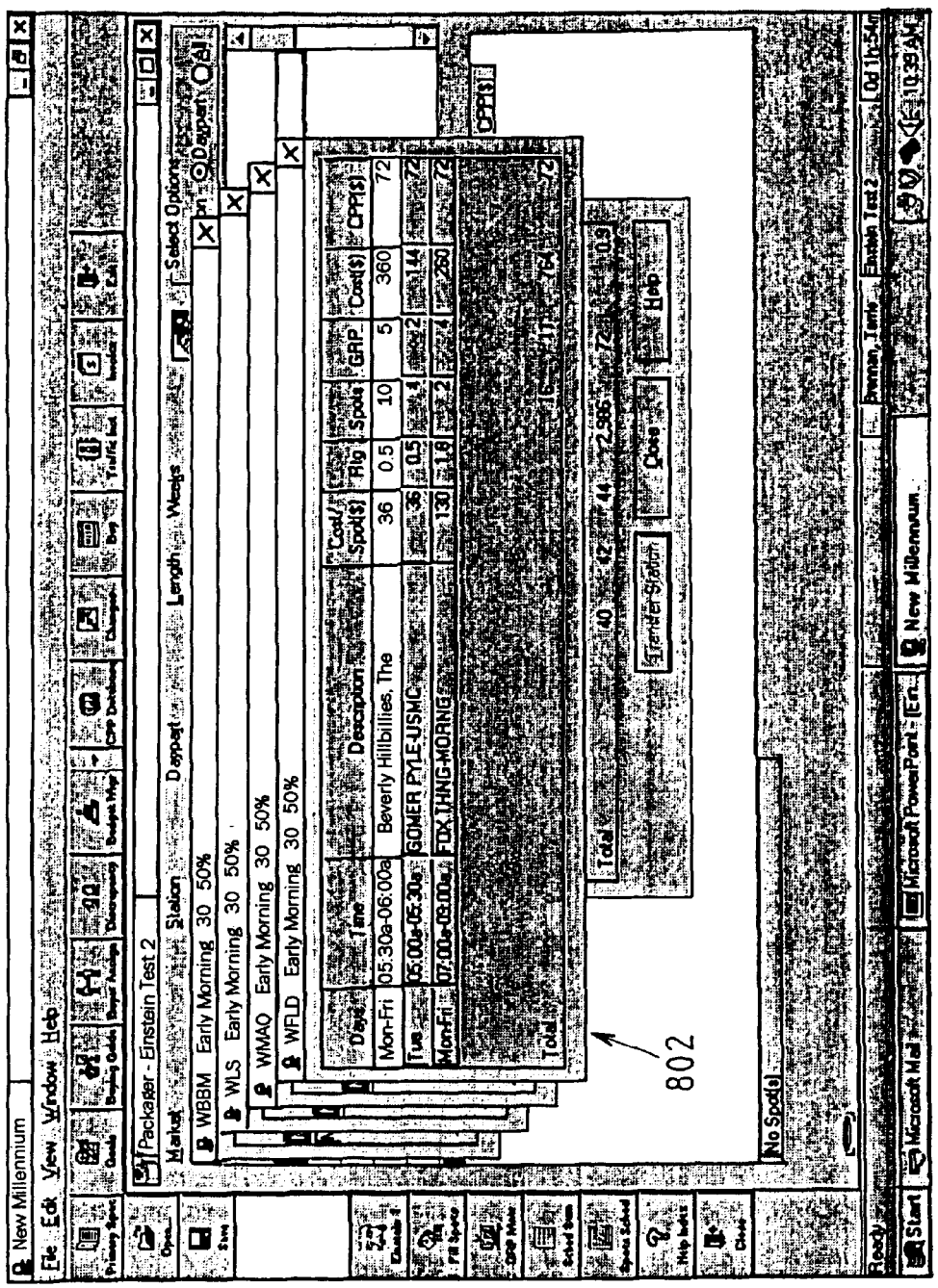

As shown in FIG. 8, the individual supplier package charts 802 identify the spots selected in the associated package in detail. For example, as shown in FIG. 8, the supplier package charts 802 identify: (a) the day(s) the spot(s) will run; (b) the time(s) the spot(s) will run; (c) the program with which the spot(s) are associated; (d) the cost per spot; (e) the rating of the associated program; (f) the number of spots packaged in the program; (g) the GRPs for the spot(s) in the program; (h) the total cost of the spot(s) in the program; and (i) the CPP of the spot(s) in the program. In the example of FIG. 8, Einstein placed a total of sixteen spots distributed through three separate programs. As with the summary chart 800, the individual supplier package charts 800 each preferably includes totals for some of the displayed categories.

In order to facilitate selection between the packages developed by the Einstein 1 logic, the logic is preferably adapted to respond to inputs to resort the charts 800, 802. In particular, the logic is preferably adapted to respond to a user clicking on a column heading to re-sort the subject chart 800, 802 in ascending order based on the variable associated with the selected column. This sorting function is represented by blocks 172–174 in FIG. 3E.

The charts 800, 802 provide the user with the opportunity to review and select between the supplier packages developed by Einstein 1. For example, at block 176, if the user clicks on a package in the summary chart 800 and then selects the "transfer package" icon 806 (see FIG. 9), the selected package will be transferred to a schedule identifying the final package (block 180). When one or more supplier packages are so transferred to the final package (blocks 176 and 180), a schedule showing all of the spots in the final package is displayed (block 182). If desired, the user can display the current schedule without making modifications thereto (block 178).

After displaying the schedule (block 182), the user can modify the final package by adding or removing spots. If a user enters inputs to modify the schedule (block 184), the schedule is updated in memory and displayed (block 186).

Whenever the schedule is displayed, the user has the opportunity to transfer the finalized package schedule to an output device 16 (block 188). Such a transfer would be effected, for example, when the user wishes to actually purchase spots from the media suppliers or when the user wishes to propose the finalized package to a client or a supervisor. As discussed above, the output device 16 can be implemented in many ways without departing from the scope or spirit of the invention. For example, the output device 16 could be a printer to enable the user to print out finalized packages and physically mail, fax or otherwise deliver the schedule to interested parties (e.g., clients, suppliers, etc.). By way of another example, the output device could be a modem, a fax machine or card, an e-mail connection, or the like which enables the user to electronically transfer the schedule to interested clients, suppliers and/or co-workers. Such electronic transfer enables electronic buying of the spots in the schedule directly from the apparatus 10.

In any event, if the user decides to transfer the schedule (block 188), the schedule is transferred in the manner defined by the user (block 190).

Figure 9:
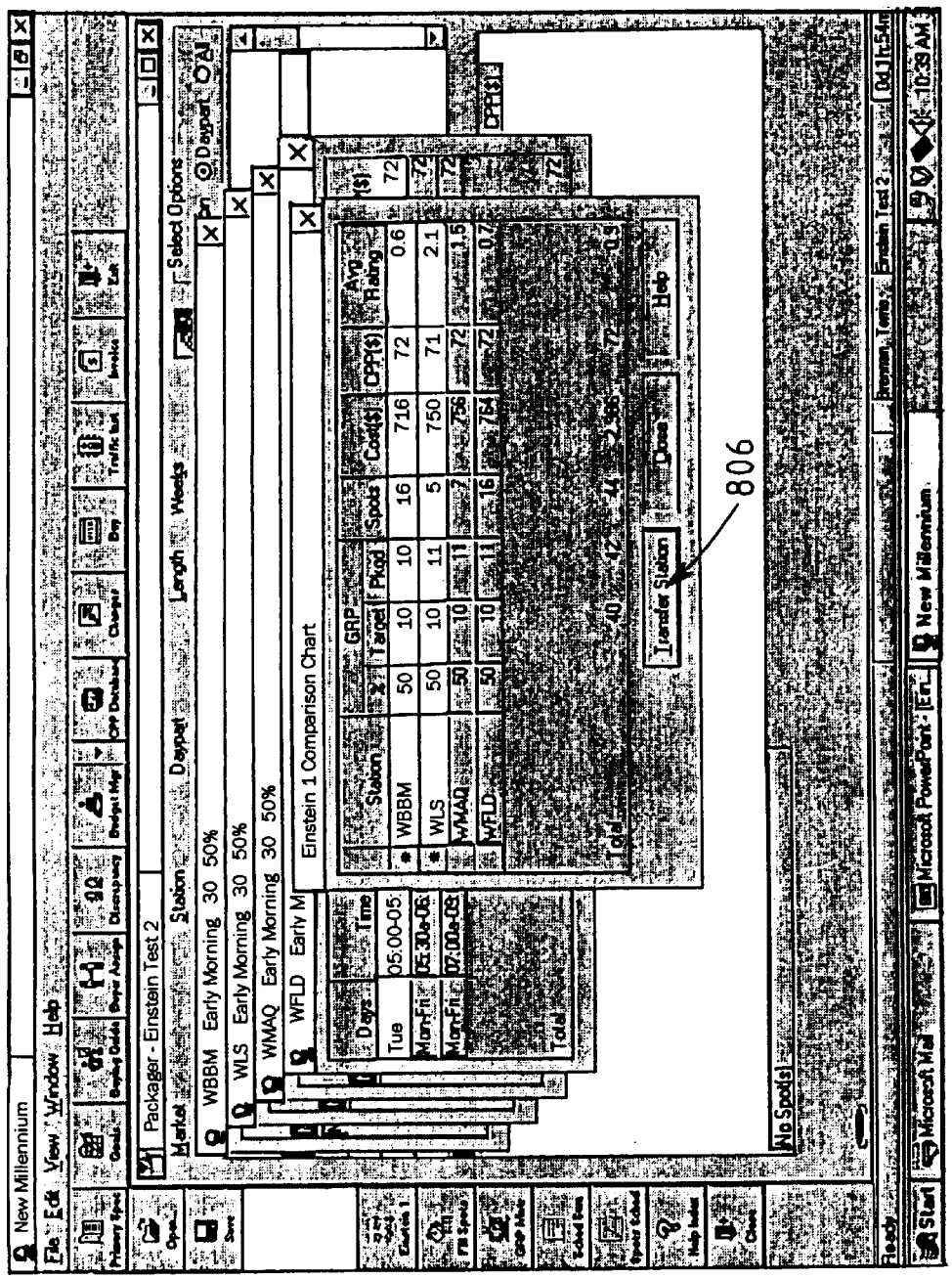
FIG. 9 is a view similar to FIG. 7 but illustrating an example selection of station packages for inclusion in a campaign package generated by the Einstein 1 routine.

As shown in FIGS. 7–9, the user is provided with many opportunities to start a new package process. For example, the user can close the comparison chart 800, the supplier package windows 802, or the schedule at any time (block 192) and return to the original graphical user interface 40 (blocks 101 and 102 in FIG. 3A) illustrated in FIG. 4. As illustrated by blocks 178 and 194 of FIGS. 3E and 3F, the user is also given the opportunity to toggle between the summary and supplier package charts 800, 802 and the schedule showing the final package. Control continues to loop through block 170–194, accepting and responding to user inputs until the user re-sets the system (block 192) by returning to the graphical user interface of FIG. 4.

As will be appreciated by those skilled in the art, the Einstein 1 logic creates a package for a single daypart. If a multi-week campaign were being planned, several iterations of the Einstein 1 routine would be necessary to package all dayparts. If a multi-week campaign were being planned, the buyer could use the one week results generated by Einstein 1 to purchase spots in subsequent weeks (sometimes with minor tweaks to ensure the total target GRPs for the campaign is met). The week by week modifications are preferably made to the schedule at blocks 184 and 186 in FIGS. 3E and 3F.

The second model of operation of the apparatus 10 will now be explained in connection with the portion of the flow chart appearing in FIGS. 3G–3M and the screen prints illustrated in FIGS. 10–14. The second model of operation, Einstein 2, builds on Einstein 1 to create a more sophisticated system that builds a campaign across multiple dayparts and which optionally utilizes validator logic 20 to ensure the packages generated gain the benefit of bulk discount opportunities. As discussed below, the Einstein 2 logic enables the user to define maximum and minimum supplier allocations and to determine the order in which the daypart packages are constructed.

Figure 10:
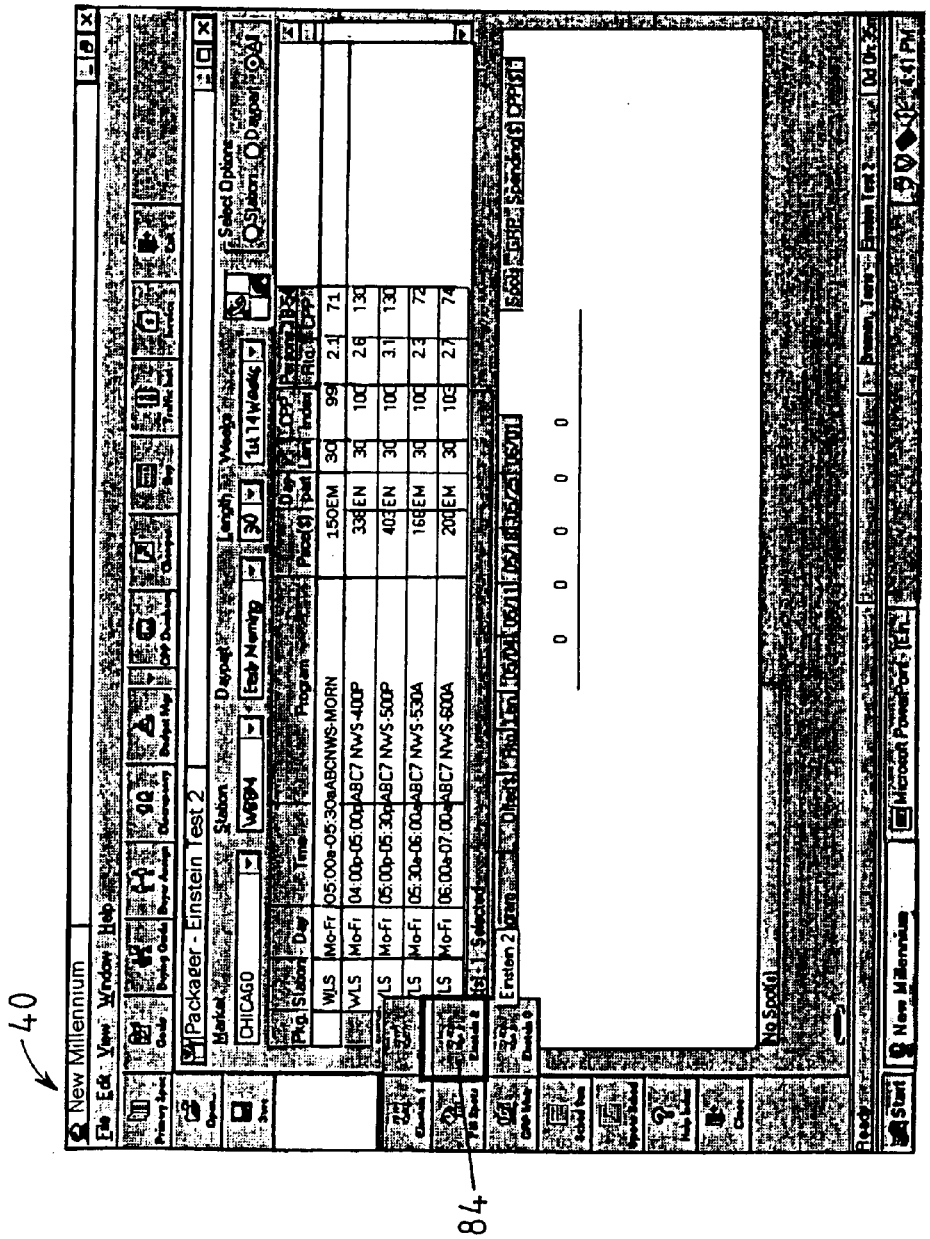
FIG. 10 is a view similar to FIG. 4, but illustrating the selection of the Einstein 2 routine.

Returning to FIG. 3A, when the original graphical user interface 40 is displayed (block 102), the user has the opportunity to select Einstein 1, Einstein 2, or Einstein 3 for proceeding (block 106). If Einstein 2 is selected as shown in FIG. 10 (block 108), control proceeds to block 200 via blocks 110 and 112 (see FIG. 3G).

Figure 11:
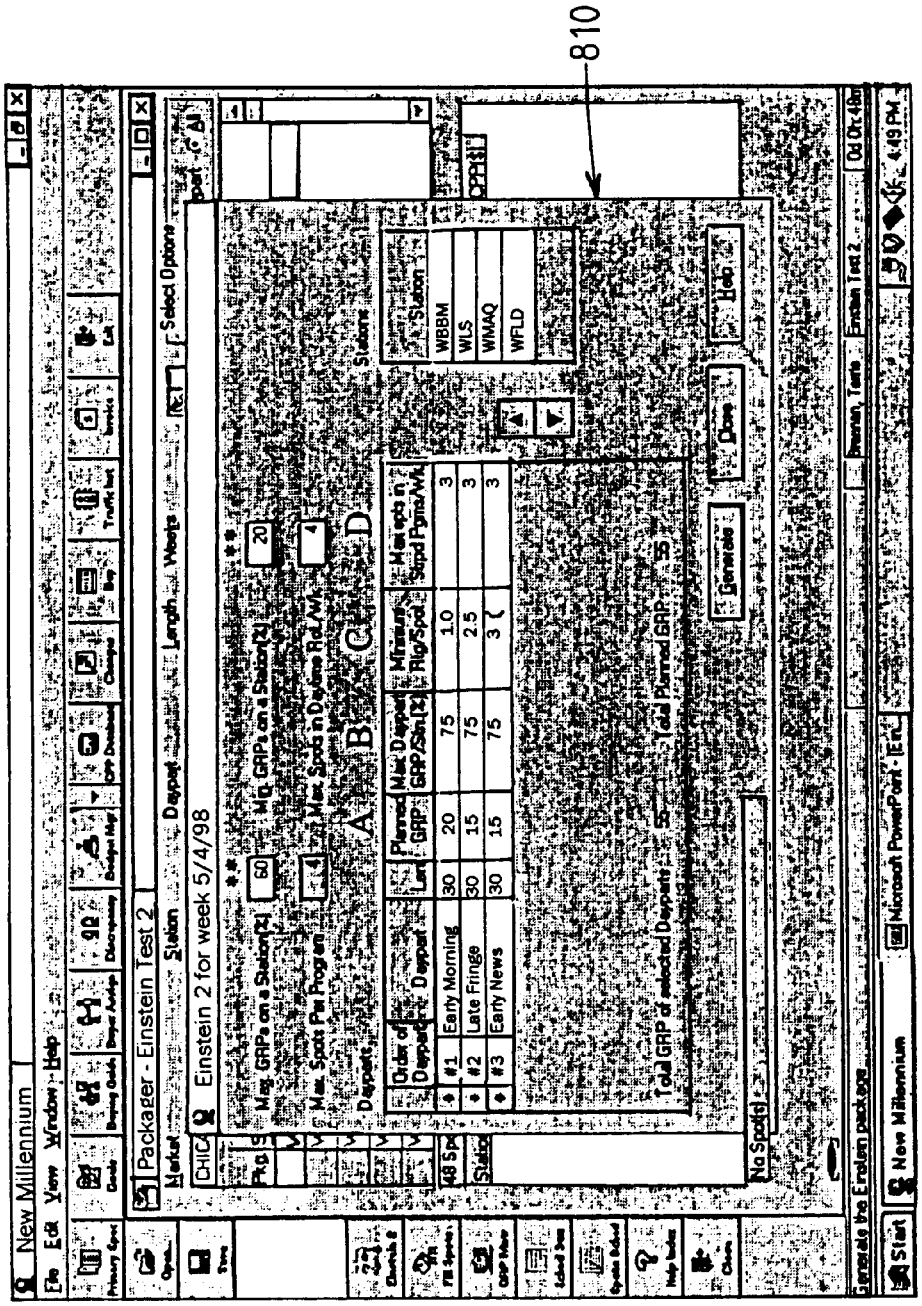
FIG. 11 is a view similar to FIG. 6 but illustrating an exemplary graphical user interface for setting the package controls in the Einstein 2 routine.

As with Einstein 1, upon selection of Einstein 2, the user is provided with a window 90 (see FIG. 5) asking the user to select a week for packaging. Once this selection is made, the Einstein 2 graphical user interface (GUI) 810 shown in FIG. 11 is displayed (block 200). As shown in FIG. 11, the Einstein 2 GUI 810 enables the user to enter values for additional guideline variables which are not available in the Einstein 1 paradigm. For example, via the Einstein 2 GUI 810, the user can enter: (a) a maximum percentage of total campaign GRPs that may be allocated to any one supplier; (b) a minimum percentage of total campaign GRPs that may be allocated to any one supplier; (c) the maximum percentage of planned GRPs for a daypart that may be allocated to any one supplier; (d) the number of GRPs to be allocated to each daypart; and (e) the order in which the daypart packages are to be constructed. As with Einstein 1, the user can also define: (a) the maximum number of spots per program; (b) the minimum rating; (c) the maximum number of spots in a stripped program; and (d) the maximum number of spots in a daytime rotation. Also like Einstein 1, the user can optionally select suppliers for inclusion or exclusion from the campaign. Additionaly, although some of the above variables will automatically be imported from the guideline variables defined by the media plan, as with Einstein 1, the user can optionally override these values, if desired.

Figure 3G:
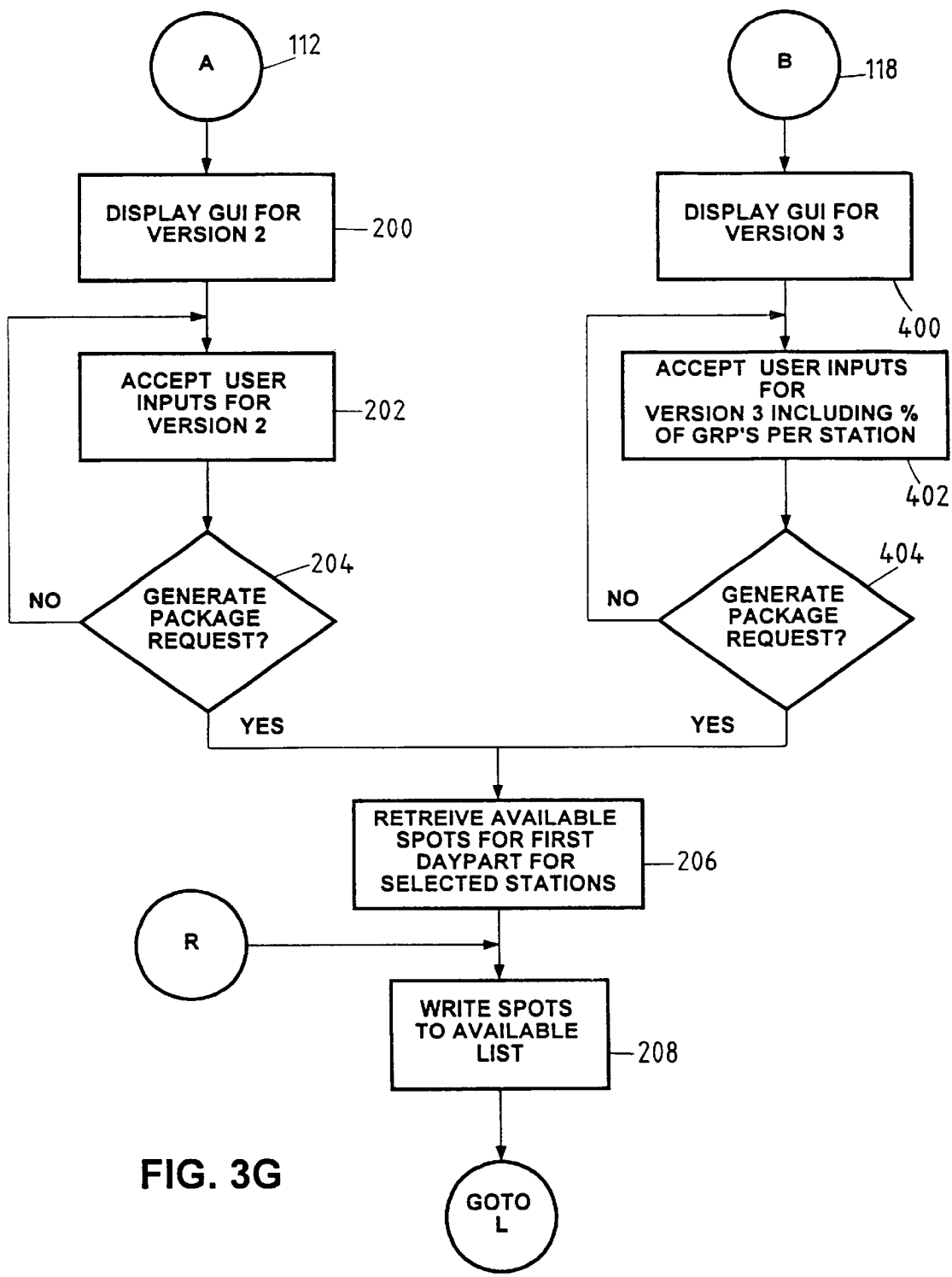

As shown in FIG. 3G, after the Einstein 2 GUI 810 is displayed (block 200), the logic will continue looping through block 202 and 204 in a manner similar to Einstein 1 accepting user inputs until the user requests the generation of a package by selecting the generate icon (block 204). Upon receipt of the generation request, control proceeds to block 206.

At block 206, the daypart selector logic 24 retrieves the available spots for the first daypart for the selected stations. These spots are then written to an available list (block 208). This process can be performed in the same manner as that described above in connection with blocks 126 and 128 of FIG. 3B. Thus, as discussed above, the available list can be created by actually copying the appropriate data structures from the data base of spots in the memory 12 into a short list in a separate memory location, or by setting flags in the data structures of the original database without departing from the scope or spirit of the invention.

Upon completion of the available list for the first daypart, the logic enters a loop wherein the spot selector 26 and tester 28 proceed to search for, select, and test spots against the guideline variables. Many of these steps are similar to the steps performed in the Einstein 1 model to perform these functions. In particular, blocks 230–254 and 256–262 are identical to blocks 130–134 and 156–162, respectively. In the interest of brevity, the description of those steps will not be repeated here.

Steps 253 and 255 in FIG. 3I are not performed by Einstein 1. Specifically, as shown in FIG. 3I, after the Einstein 2 logic determines that either the current spot being tested is not associated with a rotational program (block 250), or that selecting the spot would not exceed the maximum number of spots for that rotation (block 252), control proceeds to block 253.

At block 253, the tester logic 28 determines whether packaging of the current spot would exceed the maximum percentage of GRPs for the supplier associated with the spot defined in the guideline variables by more than some pre-defined permissible amount (such as 1 or 2 GRPs) optionally selected by the user. If so, all of the spots associated with the subject supplier are eliminated from the available list (block 255) and control returns to block 232 (FIG. 3H) where the next available spot can be selected and tested. Otherwise, control proceeds to block 256 where the spot is added to the selected spot list as was described in connection with block 156 above.

Figure 3H:
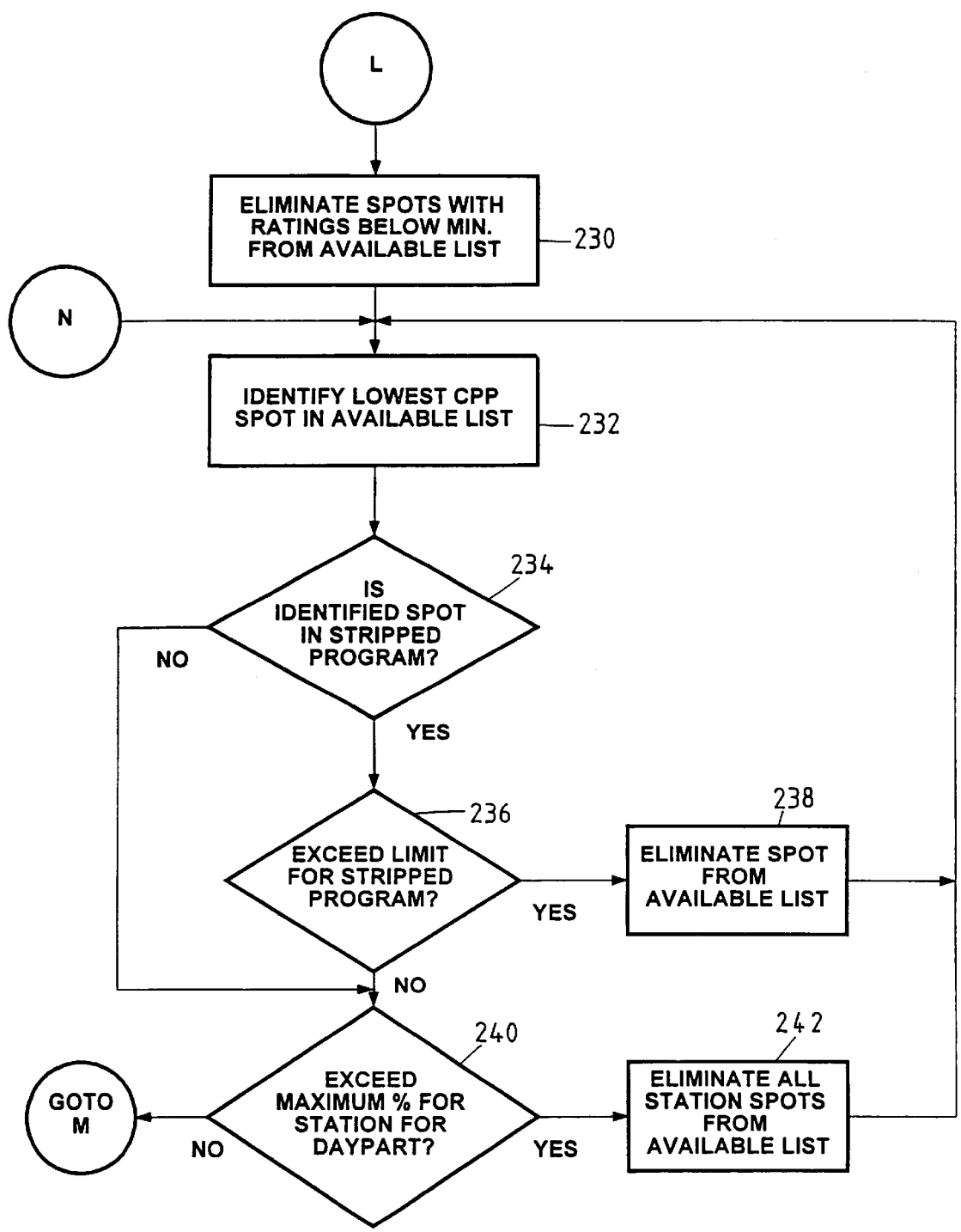
Figure 31:
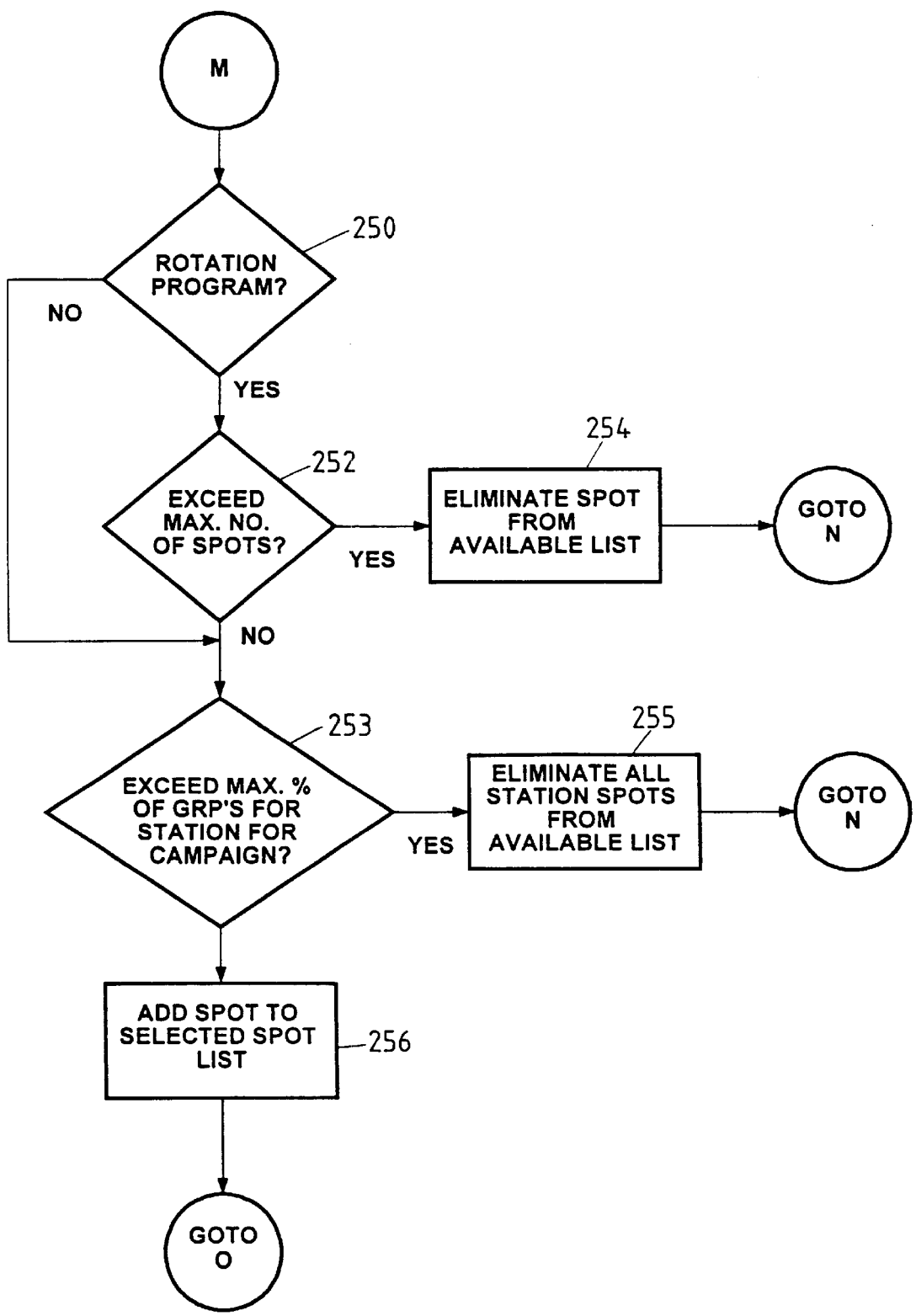
Figure 3J:
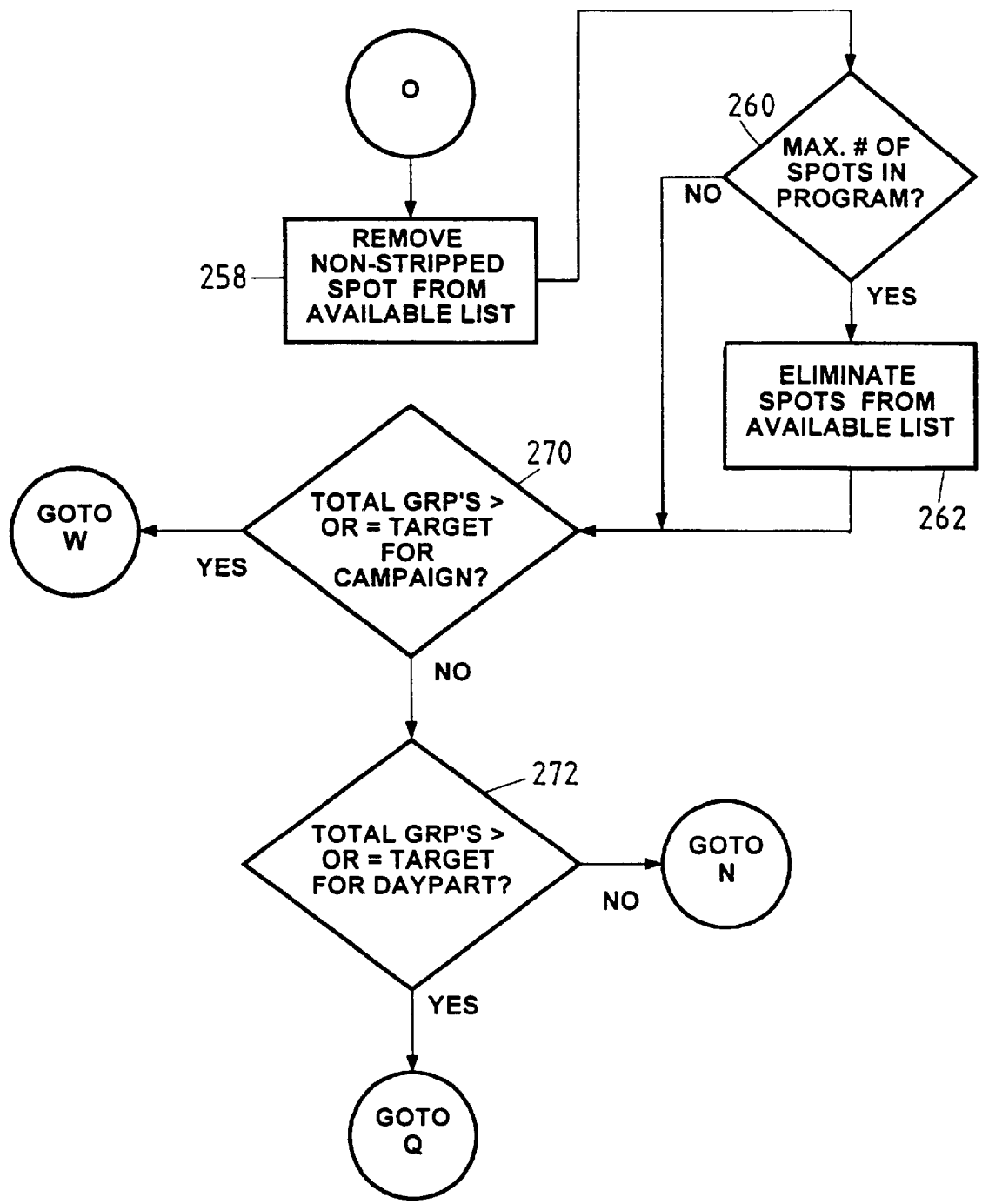
Figure 3K:
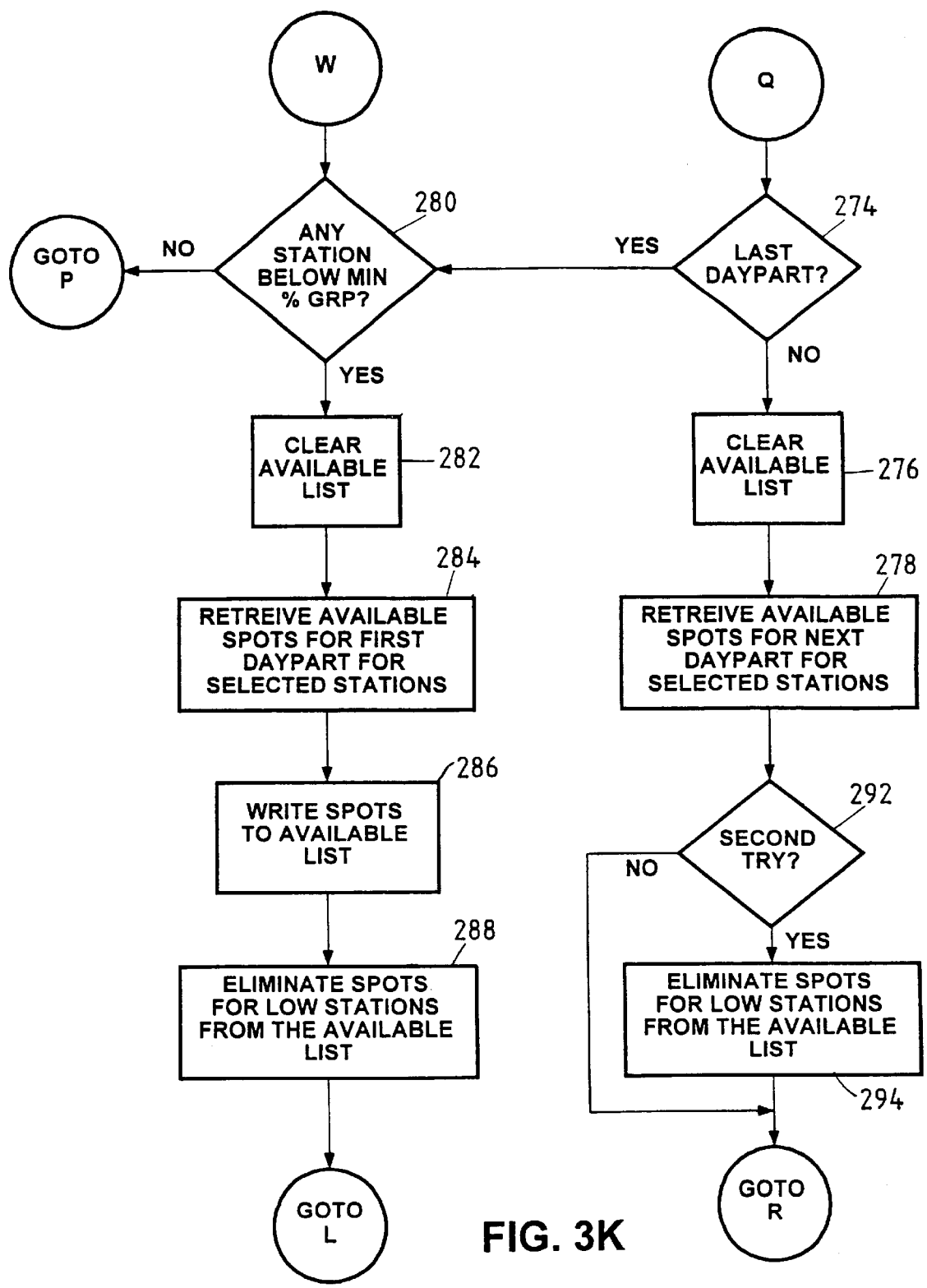

Turning to FIG. 3J, upon reaching block 270, the Einstein 2 logic checks to determine whether the total GRPs in the selected spot list equal or exceed the target GRPs for the campaign defined in the guideline variables. If so, control proceeds to block 280 (FIG. 3K). Otherwise, control proceeds to block 272.

At block 272, the logic checks to determine whether the total GRPs selected for the daypart equal or exceed the target number of GRPs to be assigned to that daypart. If so, control proceeds to block 274 (FIG. 3K). If no, control returns to block 232 of FIG. 3H where selection of the next spot can occur.

After the target number of GRPs have been selected for a daypart (block 272), the Einstein 2 logic determines whether there are additional dayparts to package (block 274). If additional dayparts remain, the current available list is cleared (block 276), and the available spots for the next daypart (as defined by the order entered by the user) are retrieved from the database (block 278) in a manner similar to that described in connection with block 206. Skipping for the moment a description of blocks 292 and 294, control then returns to block 208 (FIG. 3G) where a new available list is written. The logic then continues to loop through blocks 230–278 selecting spots for dayparts until either (a) the total GRPs packaged across all dayparts exceeds or equals the target total GRPs (block 270), (b) the last daypart has been packaged (block 274, FIG. 3K), or (c) no more spots remain to package in the last database (block 232, FIG. 3H). If any of these events occur, control proceeds to block 280 in FIG. 3K.

Before continuing on with the description, a further note about block 232 in FIG. 3H is in order. As described above in connection with block 132, occasions may arise wherein no more spots remain in the available list and the total GRPs for the current daypart have not been reached. If this occurs, the logic jumps to block 274 of FIG. 3K. If the last daypart has been processed (although not completely filled due to the lack of spots) control will then proceed to block 280 as mentioned above. Otherwise control proceeds to blocks 276, 278 and back to 208 where the packaging of the next daypart will proceed.

Figure 3L:
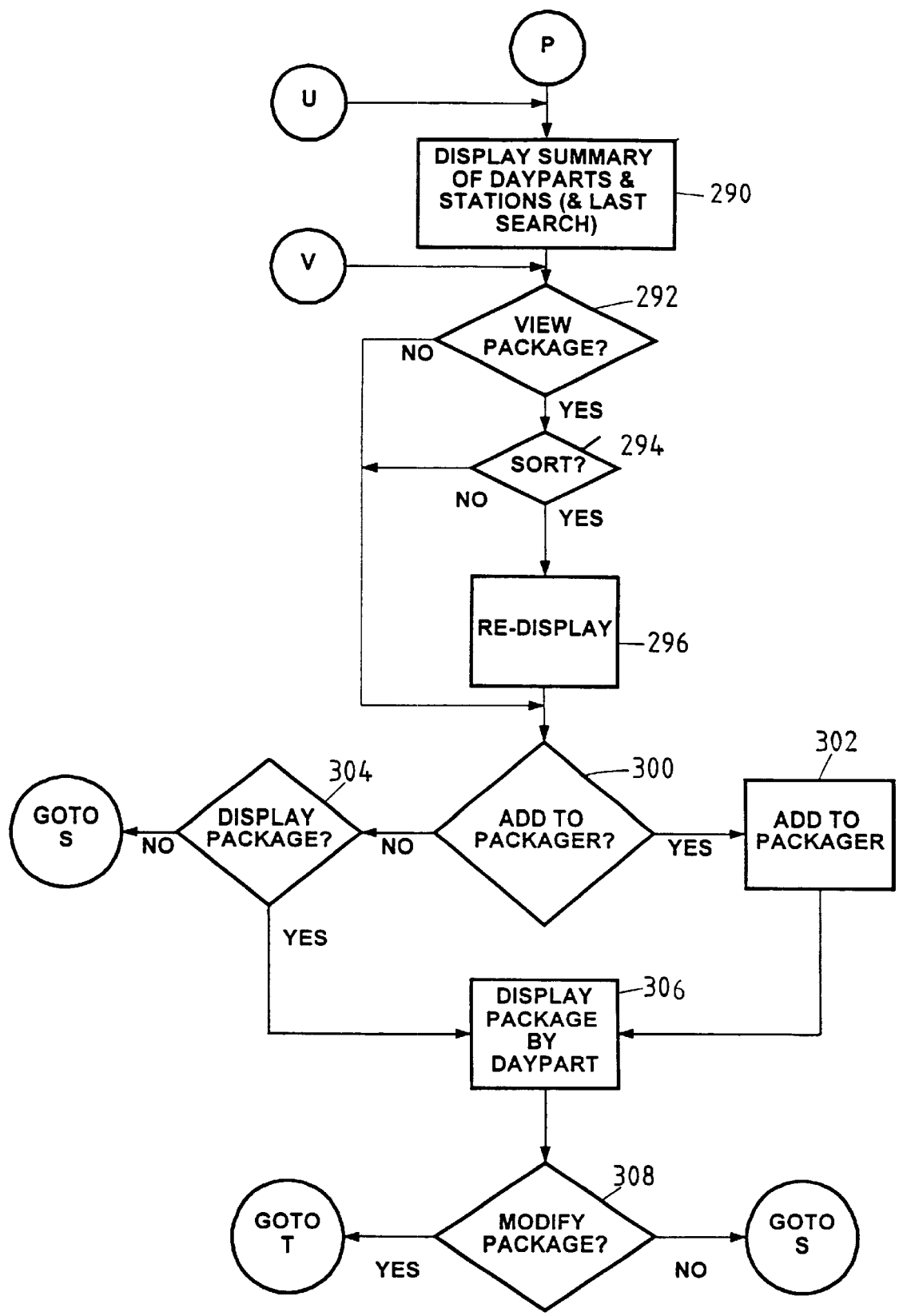

Upon reaching block 280, the validator logic 20 checks to determine whether any of the media suppliers who have been assigned spots in the prepared package have been assigned less than the minimum percentage of the total GRPs defined in the guideline variables. If no such media suppliers exist, control proceeds to block 290 (FIG. 3L). Otherwise, the validator logic 20 has determined that the current package developed by Einstein 2 is unacceptable. Accordingly, the current available list is cleared (block 282), and a new available list for the first daypart as identified in the order specified by the user in the guideline variables is created (blocks 284 and 286). At block 288, all spots associated with the media suppliers who, on an earlier run, did not meet the minimum GRP percentage, are eliminated from the available list. Control then returns to block 230 (FIG. 3II) where the Einstein 2 logic will continue looping through blocks 230–294 until a package meeting the bulk discount criteria of the validator 20 is created.

As shown in FIG. 3K, whenever a new available list is created at blocks 276 and 278 to initiate the creation of a package in a new daypart, the control logic determines whether the validator logic 20 has rejected an earlier package created by the Einstein logic for the current run (block 292). If so, all of the spots associated with the media suppliers that did not meet the validation criteria in the earlier package(s) are eliminated from the new available list (block 294). Although block 292 is described as an inquiry into a second try, persons skilled in the art will appreciate that second or subsequent tires will cause control to enter block 294.

Figure 12:
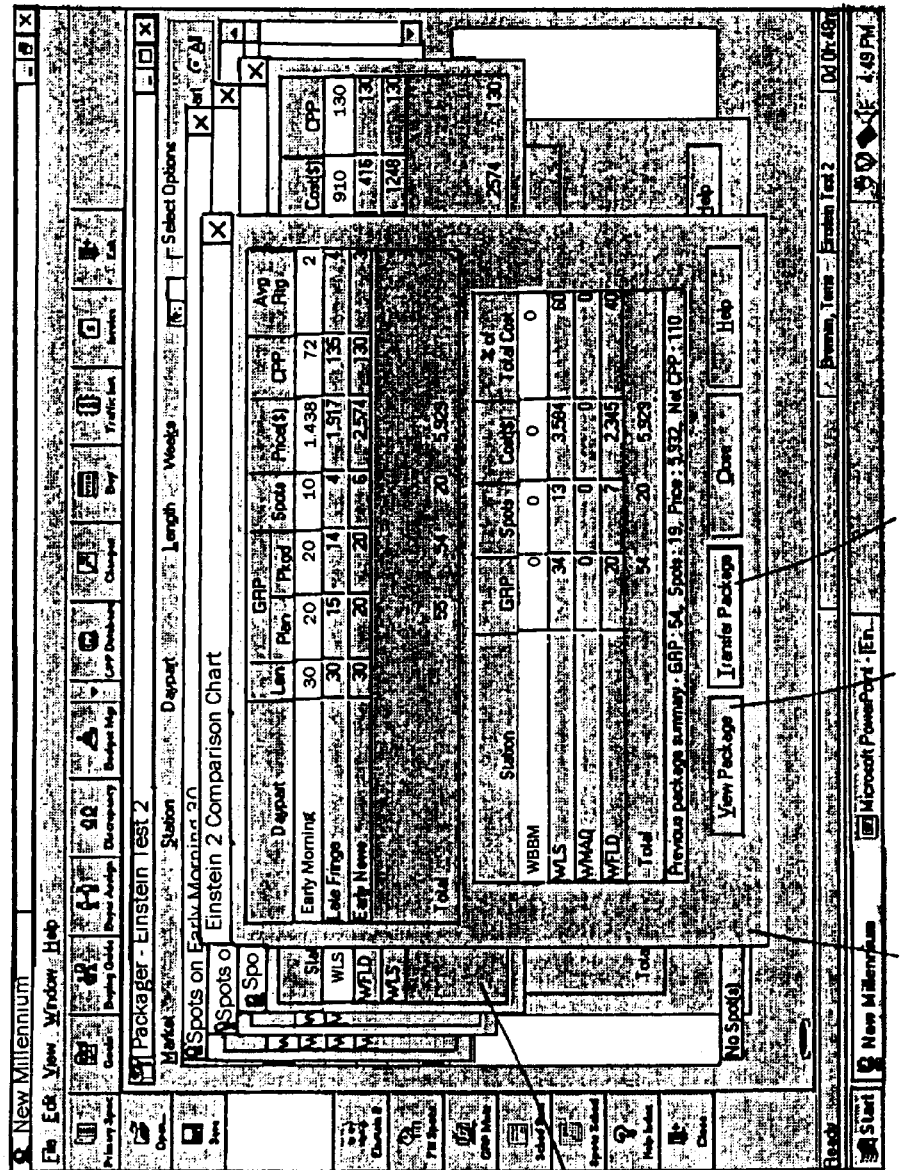
Figure 14:
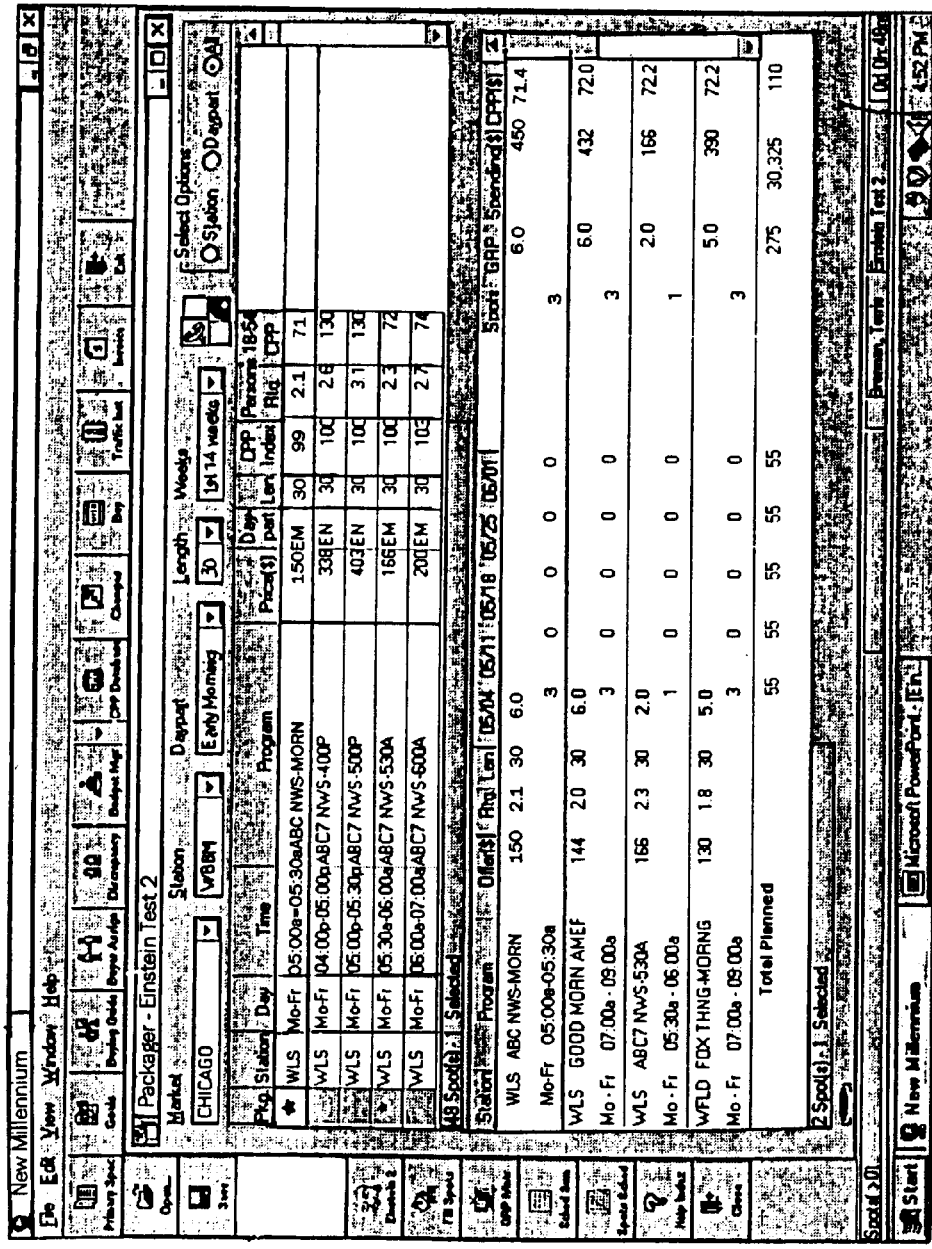
FIG. 14 is a view similar to FIG. 9, but illustrating an example selection of spots for inclusion in a campaign package generated by the Einstein 2 routine.

When a package meeting the validation criteria is arrived at (block 280), control proceeds to block 290 (FIG. 3L). At block 290, the Einstein 2 logic displays a comparison chart 830 and a plurality of daypart package charts 840. As shown in FIG. 12, the comparison chart 830 preferably includes a daypart summary and a station summary. The daypart summary lists the planned GRPs, the actual GRPs delivered by the packages, the number of spots placed in the dayparts, the total price of the spots, the average CPP of the spots, and the average rating of the spots in each daypart. This information will give the buyer some perspective on the package that has been compiled by the Einstein 2 logic. The station summary portion of the comparison chart 830 identifies all of the addressed suppliers in a side-by-side format. It identifies the total GRPs assigned to each supplier, the spots placed on each supplier, the cost of the placed spots for each supplier, and a percentage of total costs assigned to each supplier. Similar information to that provided in the comparison chart is available in the daypart summaries on a supplier-by-supplier basis.

Figure 13:
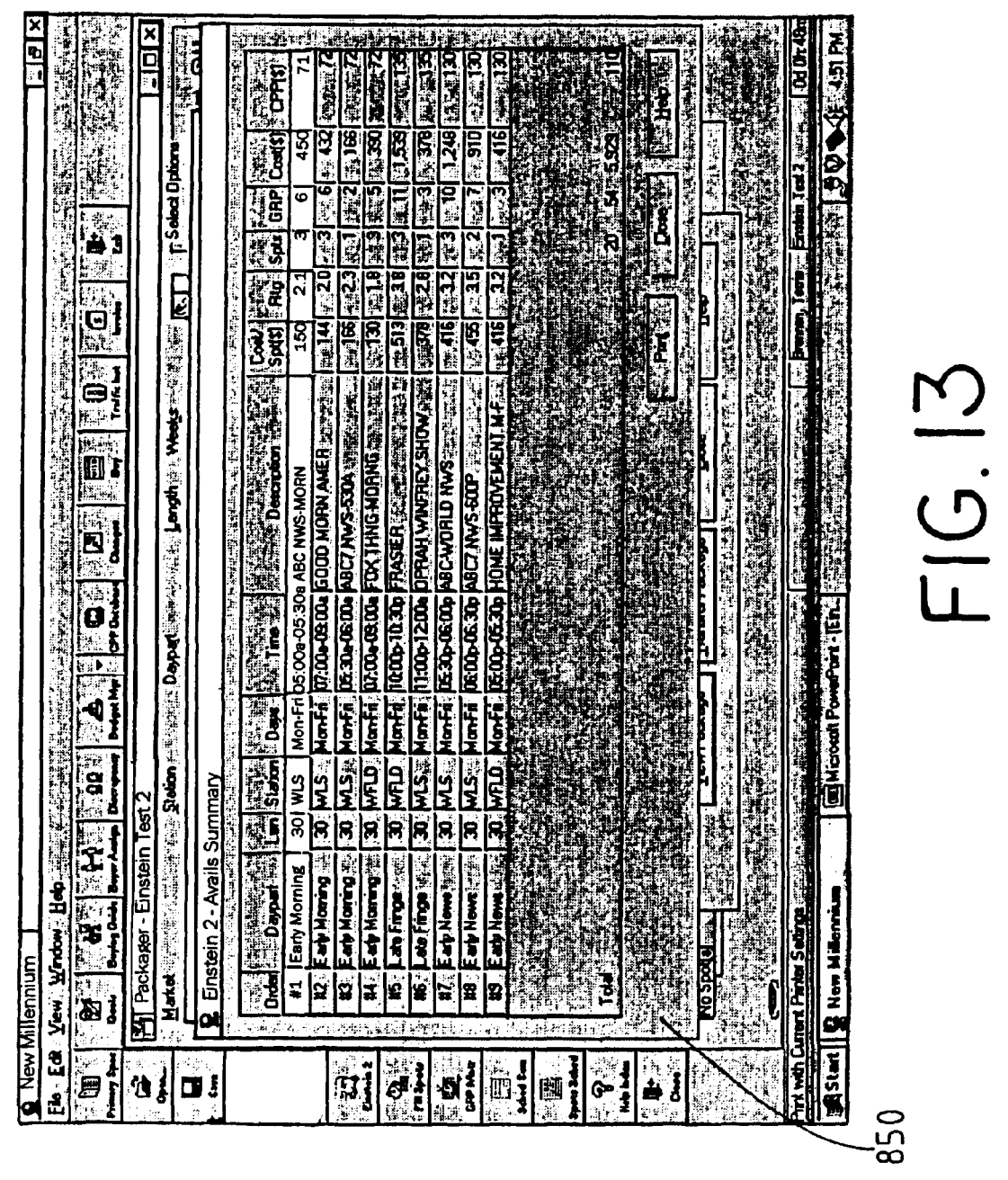

If the user would like to view the individual spots that have been selected by the Einstein 2 logic, he/she need only point and click on the view package icon 842 appearing in the comparison chart 830. When such a request to view the package is detected (block 292), the individual spots selected by the Einstein 2 logic will be displayed as shown in FIG. 13. As with the display charts 800, 802 discussed in connection with the Einstein 1 model, the Einstein 2 model is provided with sorting logic which responds to inputs from the user such as a point and click on a column heading of the displayed charts 830, 840 and 850 to re-sort the displayed information based on the variables associated with the selected column. This sorting logic and redisplay function is represented in FIG. 3L by blocks 294 and 296. Preferably, the original order of display for the package shows the order in which Einstein 2 selected the spots. The order of selection is preferably reflected in the first column in the list of selected spots 850 as shown in FIG. 13.

Figure 3M:
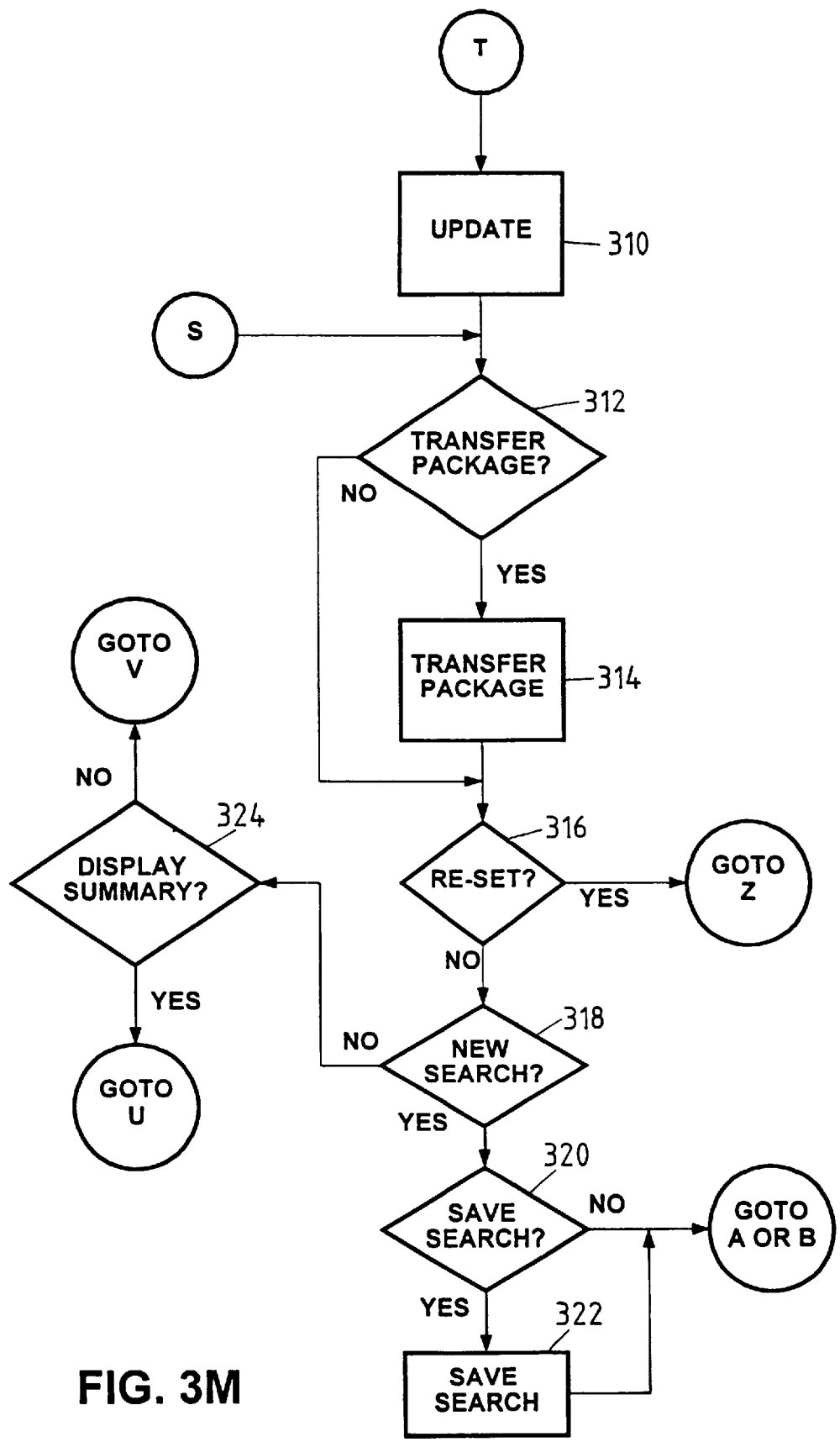

If the user finds the developed package acceptable, he/she can click on the "transfer package" icon 852 in the comparison chart 830 (FIG. 12). Upon receipt of such a request to add the package to the packager (block 300), the logic proceeds to block 302 where the selected package is entered in a package screen 860 (see FIG. 14). The package screen is displayed to the user (block 306). The user then has the opportunity to "tweak" the package, if desired. In particular, the user can add or delete spots from the package using conventional data entry techniques. As shown in FIGS. 3L–3M, the Einstein 2 logic responds to such tweaking by updating the package in memory and in the display (blocks 308 and 310).

Once the user is satisfied with the package (i.e., all tweaking is completed), the user can transfer the package to an output device 16 (blocks 188 and 190) as described in connection with blocks 188 and 190 of the Einstein 1 model above.

As with the Einstein 1 model, the user may reset the program at any time (block 316). Upon selection of the reset option, control will return to block 102 (FIG. 3A) where the original graphical user interface 40 shown in FIG. 4 will be displayed and user inputs will be accepted.

If upon viewing the package developed by the Einstein 2 logic, the buyer decides that he/she would like to adjust the guideline variables and then repeat the packaging process, he/she can enter an input indicating that a new search is desired. Upon receipt of such a request for a new search (block 318), the logic will prompt the user to indicate whether the current search results should be saved (block 320). If so, the results are saved at block 322 and control returns to block 200 of FIG. 3G. Otherwise, the current package results are not saved, and control returns to block 200 of FIG. 3G. As shown in FIG. 12, when a search is repeated and the previous package results were saved at block 322, when the comparison chart 830 of the second package is displayed, a summary of the previous package is displayed on the bottom of the comparison chart 830 to facilitate comparison and selection between the last two packages developed by the Einstein 2 logic.

As with the Einstein 1 logic, the Einstein 2 logic provides the user with the ability to toggle between displaying the contents of the packager and displaying the comparison chart and daypart summaries 830, 840 (see block 304 in FIG. 3L and block 324 in FIG. 3M). Control will continue to loop through blocks 290–324 until the user either (a) resets the apparatus (block 20 316), or (b) until the user requests a new search (blocks 318–322).

As mentioned above, the apparatus 10 provides a third model of operation referred to herein as the Einstein 3 logic. The Einstein 3 model is very similar to Einstein 2. However, unlike Einstein 2, the Einstein 3 model requires the user to select the percentage of GRPs that will be placed on each station prior to commencing the packaging process. In other words, the Einstein 3 model permits the user to predetermine the distribution of GRPs to be placed on stations by the package developed by Einstein. By way of example, not limitation, a user might determine that channel A is to receive 25% of the total GRPs, channel B is to receive 30% of the total GRPs and channel C is to receive 45% of the total GRPs. This approach would be useful, for example, to meet the buyer's contractual obligations. In any event, with these percentages set as guideline variables, the Einstein 3 logic will proceed almost identically to the Einstein 2 logic to develop a package fitting the supplier percentages required by the user.

Figure 15:
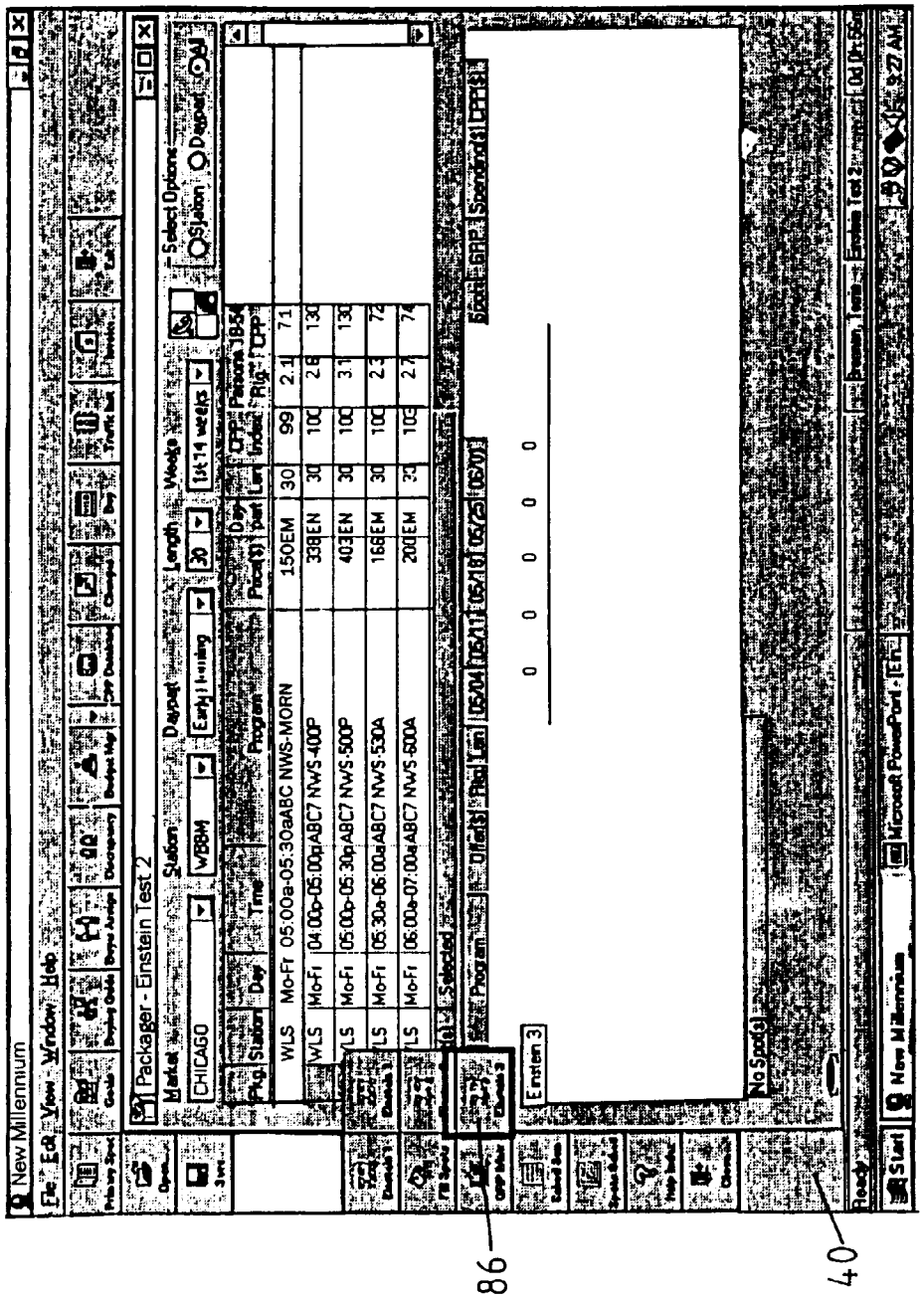
FIG. 15 is a view similar to FIGS. 4 and 10, but illustrating the selection of the Einstein 3 routine.
Figure 16:
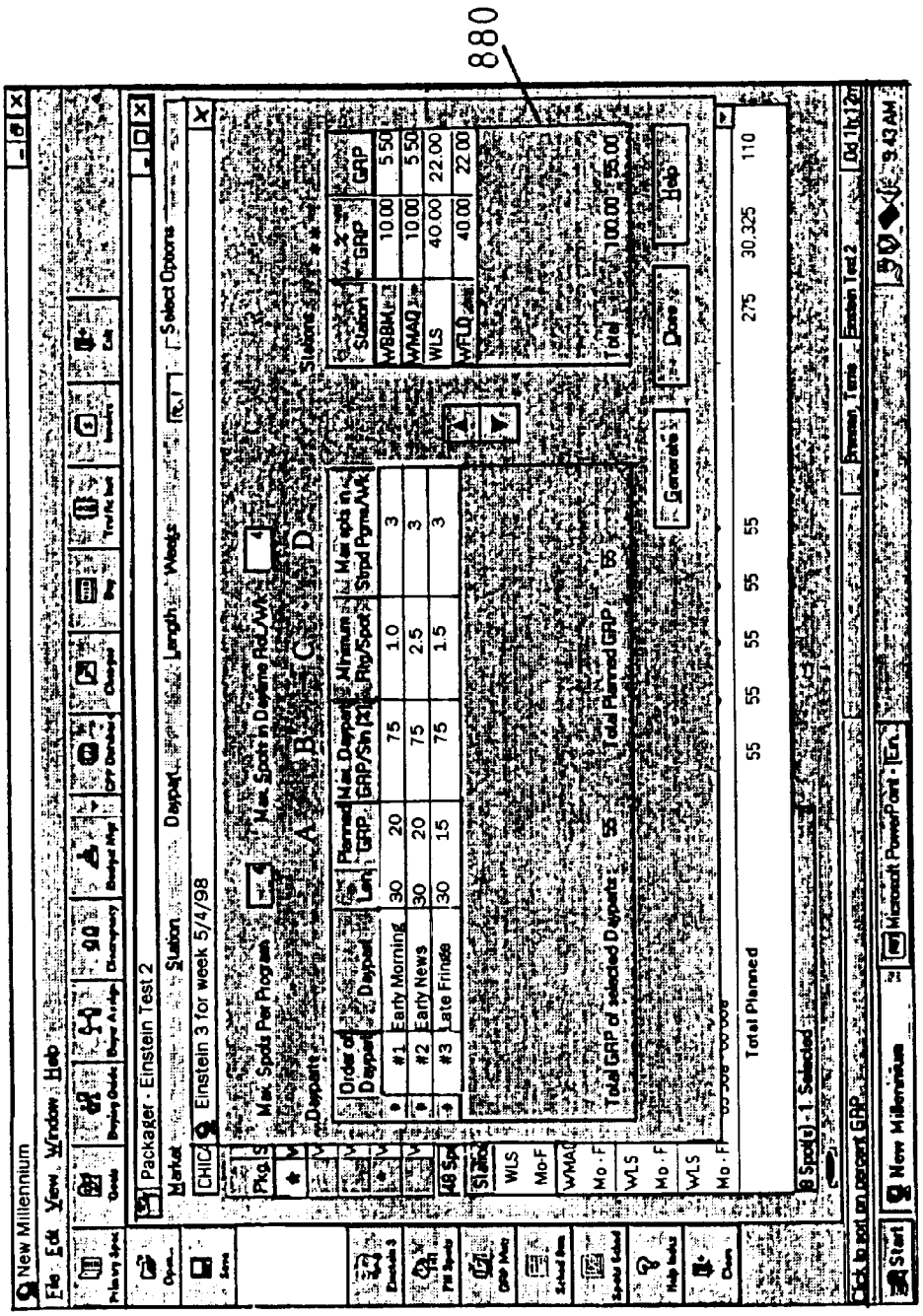
FIG. 16 is a view similar to FIGS. 6 and 11 but illustrating an exemplary graphical user interface for setting the package controls in the Einstein 3 routine.

Turning to FIG. 3A, when a user selects the Einstein 3 icon 86 from the graphical user interface 40 (see FIG. 15), control proceeds through blocks 106, 108, 114 and 116 of FIG. 3A to blocks 118 and 400 of FIG. 3G. At block 400, the graphical user interface 880 for the Einstein 3 logic is displayed (see FIG. 16). As shown in FIG. 16, the Einstein 3 GUI 880 is similar to the Einstein 2 GUI 810. However, in the Einstein 3 model, the user is not permitted to set separate maximum and minimum percentages of the total campaign GRPs that may be allocated to any one station. Instead, the user identifies target percentages for each media supplier. These target percentages should add up to 100%. Einstein 3 will then attempt to develop a package meeting the percentages required by the user.

As shown in FIG. 3G, as with Einstein 2, upon display of the Einstein 3 GUI 880, the Einstein 3 logic enters a loop where it will accept user inputs (block 402). The Einstein 3 logic will remain in this loop until a request to generate a package (block 404) has been received, or a request to exit the Einstein 3 model has been received (not shown).

Once a request to generate a package has been received by the Einstein 3 logic (block 404), control will proceed through blocks 206–324 in much the same way as was described in connection with the Einstein 2 model. However, since the Einstein 3 logic does not include a minimum GRP percentage-per-station requirement (i.e., does not utilize the validator logic 20), blocks 280–288 are never entered into by the Einstein 3 logic. Instead, when either the total GRPs have exceeded or equaled the target GRPs for the campaign (block 270 in FIG. 3G) or when the last daypart has been completed (block 274 in FIG. 3K), control will proceed directly to block 290 where the package developed by the Einstein 3 logic will be displayed as discussed above.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. For use with a memory for storing a plurality of representations of available advertising spots, an apparatus for automatically developing a package of advertising spots from the plurality of available advertising spots, the apparatus comprising:

a plurality of guideline variables stored in the memory;

a daypart selector cooperating with the memory to develop a first set of available spots in a first daypart and a second set of available spots in a second daypart from the plurality of available advertising spots, the second daypart being different than the first daypart;

a spot selector cooperating with the memory and the daypart selector to develop a package of available spots from the first and second sets of available spots based on the guideline variables; and a tester cooperating with the spot selector for excluding spots from the package based on a first predefined criteria defined by at least one of the guideline variables.

2. An apparatus as defined in claim 1 wherein the representations of the available spots each respectively include a cost per point value, and wherein the spot selector develops the package by searching the first set for an available spot based on the cost per point values.

3. An apparatus as defined in claim 2 wherein the spot selector develops the package by searching the second set for an available spot based on the cost per point values.

4. An apparatus as defined in claim 3 wherein the order in which the spot selector searches the first and second sets is user definable.

5. An apparatus as defined in claim 1 wherein the spot selector and the tester complete developing a first selected one of the first and second sets before developing a second selected one of the first and second sets.

6. An apparatus as defined in claim 5 wherein the first selected one and the second selected one of the first and second sets are user definable.

7. An apparatus as defined in claim 2 wherein the spot selector continues passing spots meeting the first predefined criteria to the tester until a second predefined criteria defined by at least one of the guideline variables is satisfied.

8. An apparatus as defined in claim 7 wherein the second predefined criteria comprises a threshold sum of gross rating points to be purchased for the first daypart.

9. An apparatus as defined in claim 7 wherein the second predefined criteria comprises a threshold sum of gross rating points to be purchased for a campaign including at least the first and second dayparts.

10. An apparatus as defined in claim 1 wherein at least one of the guideline variables is user definable.

11. An apparatus as defined in claim 1 wherein the first predefined criteria comprises at least one of the group comprising: a minimum rating value, a cutoff time, a maximum number of spots per program value, a maximum number of spots in a stripped program, a media supplier identification, a maximum number of spots in a daytime rotation, a maximum percentage of gross rating points per media supplier value, a total gross rating points per campaign value, a maximum gross rating points per daypart value, a length of spot variable, a maximum gross rating points per supplier per campaign value, a maximum gross ratings points per supplier per daypart value, a target percentage of gross ratings points per a predefined supplier value, a market variable, and a target gross rating points per a predefined supplier value.

12. An apparatus as defined in claim 1 wherein at least one of the daypart selector, the spot selector and the testor comprises software executing on a microprocessor.

13. An apparatus as defined in claim 1 wherein at least one of the daypart selector, the spot selector and the testor comprises a hardware circuit.

14. For use with a memory for storing a plurality of representations of available advertising spots offered by a plurality of media suppliers, an apparatus for automatically developing a package of advertising spots from a plurality of available advertising spots, the apparatus comprising:
- a package developer cooperating with the memory to develop a package containing a subset of the representations stored in memory based on at least one of a plurality of guideline variables; and
- a validator cooperating with the package developer to validate the package by ensuring that every media supplier associated with the representations in the subset supplies a minimum percentage of the spots in the subset.

15. An apparatus as defined in claim 14 wherein, if the validator determines that a given supplier falls below the minimum percentage, the package developer develops a second package including a second subset of the representations stored in the memory based on the at least one of the plurality of guideline variables and by excluding all spots associated with the given supplier from the second subset.

16. An apparatus as defined in claim 14 wherein at least one of the package developer and the validator comprises software executing on a microprocessor.

17. An apparatus as defined in claim 14 wherein at least one of the package developer and the validator comprises a hardware circuit.

18. An apparatus as defined in claim 14 wherein the package developer comprises:
- a daypart selector cooperating with the memory to develop a first set of available spots in a first daypart from the plurality of available advertising spots;
- a spot selector cooperating with the memory and the daypart selector to develop the package of available spots from the first set of available spots based on the guideline variables; and
- a tester cooperating with the spot selector for excluding spots from the package based on a first predefined criteria defined by at least one of the guideline variables.

19. An apparatus as defined in claim 14 wherein the package developer comprises:
- a daypart selector cooperating with the memory to develop a first set of available spots in a first daypart and a second set of available spots in a second daypart from the plurality of available advertising spots, the second daypart being different than the first daypart;
- a spot selector cooperating with the memory and the daypart selector to develop the package of available spots from the first and second sets of available spots based on the guideline variables; and
- a tester cooperating with the spot selector for excluding spots from the package based on a first predefined criteria defined by at least one of the guideline variables.

20. An apparatus as defined in claim 19 wherein the representations of the available spots each respectively include a cost per point value, and wherein the spot selector develops the package by searching the first set for an available spot having a lower cost per point value than remaining available spots in the first set.

21. An apparatus as defined in claim 20 wherein the spot selector develops the package by searching the second set for an available spot having a lower cost per point value than remaining available spots in the second set.

22. An apparatus as defined in claim 21 wherein the order in which the spot selector searches the first and second sets is user definable.

23. An apparatus as defined in claim 19 wherein the spot selector and the tester complete developing a first selected one of the first and second sets before developing a second selected one of the first and second sets.

24. An apparatus as defined in claim 23 wherein the first selected one and the second selected one of the first and second sets are user definable.

25. An apparatus as defined in claim 19 wherein the spot selector continues passing spots to the tester until a second predefined criteria defined by at least one of the guideline variables is satisfied.

26. For use with a memory for storing a plurality of representations of available advertising spots, an apparatus for automatically developing a package of advertising spots from the plurality of available advertising spots, the apparatus comprising:
- a plurality of guideline variables stored in the memory, the guideline variables including supplier percentage variables defining a percentage of gross rating points to be purchased from each media supplier in a set of media suppliers;
- a daypart selector cooperating with the memory to develop a first set of available spots in a first daypart from the plurality of available advertising spots;
- a spot selector cooperating with the memory and the daypart selector to develop a package of available spots from the first set of available spots based on the guideline variables; and
- a tester cooperating with the spot selector for excluding spots from the package based on a first predefined criteria defined by at least one of the guideline variables and based upon the supplier percentage variables such that, upon completion of the package, the package contains spots from the media suppliers in the set of media suppliers apportioned in the percentages defined by the supplier percentage variables.

27. An apparatus as defined in claim 26 wherein the supplier percentage variables are user definable.

28. An apparatus as defined in claim 26 wherein the set of media suppliers is user definable.

29. A method for automatically developing a package of advertising spots from a plurality of available advertising spots, the method comprising the steps of:

developing a first set of available spots in a first daypart from a plurality of available advertising spots;

developing a second set of available spots in a second daypart from a plurality of available advertising spots, the second daypart being different than the first daypart;

developing a package of available spots from the first and second sets of available spots based on guideline variables; and excluding spots from the package based on a first predefined criteria defined by at least one of the guideline variables.

30. A method as defined in claim 29 wherein each of the available spots respectively includes a cost per point value, and wherein the step of developing a package further comprises:

searching the first set for an available spot having a lower cost per point value than remaining available spots in the first set.

31. A method as defined in claim 30 wherein the step of developing a package further comprises:

searching the second set for an available spot having a lower cost per point value than remaining available spots in the second set.

32. A method as defined in claim 31 further comprising the step of selecting the order in which the first and second sets are searched.

33. A method as defined in claim 30 wherein the step of searching the first set is repeated until a second predefined criteria defined by the guideline variables is satisfied.

34. A method as defined in claim 33 wherein the second predefined criteria comprises a threshold sum of gross rating points to be purchased for the first daypart.

35. A method as defined in claim 33 wherein the second predefined criteria comprises a threshold sum of gross rating points to be purchased for a campaign including at least the first and second dayparts.

36. A method as defined in claim 29 wherein at least one of the guideline variables is user definable.

37. A method as defined in claim 29 wherein the first predefined criteria comprises at least one of the group comprising: a minimum rating value, a cutoff time, a maximum number of spots per program value, a maximum number of spots in a stripped program, a media supplier identification, a maximum number of spots in a daytime rotation, a maximum percentage of gross rating points per media supplier value, a total gross rating points per campaign value, a maximum gross rating points per daypart value, a length of spot variable, a maximum gross rating points per supplier per campaign value, a maximum gross ratings points per supplier per daypart value, a target percentage of gross ratings points per a predefined supplier value, a market variable, and a target gross rating points per a predefined supplier value.

38. A method for automatically developing a package of advertising spots from a plurality of available advertising spots offered by a plurality of media suppliers, the method comprising the steps of:

storing a plurality of representations of available advertising spots offered by a plurality of media suppliers;

developing a package containing a subset of the representations based on guideline variables; and validating the package by ensuring that every media supplier associated with the representations in the subset supplies a minimum percentage of the spots in the subset.

39. A method as defined in claim 38 further comprising the step of:

if a given supplier falls below the minimum percentage, developing a second package including a second subset of the representations stored in the memory based on the guideline variables and by excluding all spots associated with the given supplier from the second subset.

40. A method as defined in claim 38 wherein the step of developing a package further comprises the steps of:

developing a first set of available spots in a first daypart from the plurality of available advertising spots;

developing a second set of available spots in a second daypart from the plurality of available advertising spots, the second daypart being different than the first daypart;

developing the package of available spots from the first and second sets of available spots based on the guideline variables; and excluding spots from the package based on a first predefined criteria defined by at least one of the guideline variables.

41. A method for automatically developing a package of advertising spots from a plurality of available advertising spots, the method comprising the steps of:

providing a plurality of guideline variables including supplier percentage variables defining a percentage of gross rating points to be purchased from each media supplier in a set of media suppliers;

developing a first set of available spots in a first daypart from the plurality of available advertising spots;

developing a package of available spots from the first set of available spots based on the guideline variables; and excluding spots from the package based on a first predefined criteria defined by at least one of the guideline variables and based upon the supplier percentage variables such that, upon completion of the package, the package contains spots from the user defined media suppliers apportioned in the percentages defined by the supplier percentage variables.

42. A method as defined in claim 41 wherein the supplier percentage variables are user definable.

43. A method as defined in claim 41 wherein the set of media suppliers is user definable.

* * * * *